(12) United States Patent
Burks

(10) Patent No.: US 11,619,353 B2
(45) Date of Patent: Apr. 4, 2023

(54) COMPOSITE CYLINDER MONITORING SYSTEM

(71) Applicant: HEXAGON TECHNOLOGY AS, Alesund (NO)

(72) Inventor: Brian Burks, Parker, CO (US)

(73) Assignee: HEXAGON TECHNOLOGY AS

( * ) Notice: Subject to any disclaimer, the term of this patent is extended or adjusted under 35 U.S.C. 154(b) by 0 days.

(21) Appl. No.: 17/223,628

(22) Filed: Apr. 6, 2021

(65) Prior Publication Data
US 2022/0316656 A1    Oct. 6, 2022

(51) Int. Cl.
*F17C 13/02*    (2006.01)
*B60K 15/03*    (2006.01)

(52) U.S. Cl.
CPC ........ *F17C 13/02* (2013.01); *B60K 15/03006* (2013.01); *B60K 2015/03019* (2013.01);
(Continued)

(58) Field of Classification Search
CPC .............. F17C 13/02; F17C 2250/0465; F17C 2250/0636; F17C 2260/042;
(Continued)

(56) References Cited

U.S. PATENT DOCUMENTS 4,701,659 A    10/1987  Fujii et al.
5,452,264 A *  9/1995   Holroyd ................. G01H 11/08
                                                    73/632
(Continued)

FOREIGN PATENT DOCUMENTS

FR    2978551    2/2013
FR    3022199    12/2015
(Continued)

OTHER PUBLICATIONS

James, Joseph, Giurgiutiu, "Impact Damage Detection in Composite Plates Using Acoustic Emission Signal Signature Identification", Proceedings of SPIE, May 19, 2020, https://www.spiedigitallibrary.org/conference-proceedings-of-spie.
(Continued)

*Primary Examiner* — Paul J Gray

(57)    ABSTRACT

Methods, systems, and apparatus for monitoring a cylinder. The system includes a plurality of sensors connected to the cylinder and configured to detect deformation data associated with the cylinder. The system includes a controller communicatively coupled to the plurality of sensors. The controller is configured to determine a damage value based on the detected deformation data when the cylinder endures impact damage. The controller is configured to communicate a notification when the damage value exceeds an impact damage threshold. The system includes a filling controller communicatively coupled to the plurality of sensors. The filling controller is configured to control a valve for filling the cylinder with a fluid. The filling controller is configured to detect damage to the cylinder above a specified threshold as the cylinder is filled with the fluid. The filling controller is configured to automatically perform a safety action when the damage to the cylinder is detected.

10 Claims, 16 Drawing Sheets

(52) U.S. Cl.
CPC .............. *B60K 2015/0321* (2013.01); *B60K 2015/03381* (2013.01); *B60K 2015/03407* (2013.01); *F17C 2250/0465* (2013.01); *F17C 2250/0636* (2013.01); *F17C 2260/042* (2013.01)

(58) Field of Classification Search
CPC .... B60K 15/03006; B60K 2015/03019; B60K 2015/0321; B60K 2015/03381; B60K 2015/03407
USPC ........................................................ 141/192
See application file for complete search history.

(56) References Cited

U.S. PATENT DOCUMENTS

| | | | | |
|---|---|---|---|---|
| 5,522,428 | A * | 6/1996 | Duvall | F17C 13/123 141/94 |
| 5,814,729 | A * | 9/1998 | Wu | G01M 5/0033 73/768 |
| 6,370,964 | B1 * | 4/2002 | Chang | G01M 5/0033 73/862.046 |
| 6,925,869 | B2 | 8/2005 | Senibi et al. | |
| 7,176,448 | B2 * | 2/2007 | Ogisu | G01M 11/086 250/227.16 |
| 7,373,260 | B2 | 5/2008 | Kessler et al. | |
| 7,450,023 | B2 | 11/2008 | Muralidharan et al. | |
| 7,698,943 | B2 * | 4/2010 | Bohse | G01N 29/14 702/82 |
| 8,447,530 | B2 * | 5/2013 | Pado | G01M 7/025 702/36 |
| 8,502,685 | B2 | 8/2013 | McFeeters | |
| 9,470,659 | B2 * | 10/2016 | Chaume | F17C 13/02 |
| 9,694,674 | B2 | 7/2017 | Dudar et al. | |
| 10,197,460 | B2 | 2/2019 | Kawamura et al. | |
| 10,473,624 | B2 * | 11/2019 | Philtron | G01N 29/14 |
| 10,678,390 | B2 | 6/2020 | Lee | |
| 10,845,912 | B2 | 11/2020 | Park et al. | |
| 2006/0179949 | A1 * | 8/2006 | Kim | G01N 29/4463 73/618 |
| 2007/0041273 | A1 | 2/2007 | Shertukde | |
| 2008/0148853 | A1 | 6/2008 | Kim | |
| 2010/0107765 | A1 * | 5/2010 | Murakami | G01N 29/043 73/587 |
| 2013/0327148 | A1 * | 12/2013 | Yan | G01N 29/341 73/628 |
| 2015/0128709 | A1 * | 5/2015 | Stewart | G01N 29/11 73/588 |
| 2016/0010802 | A1 * | 1/2016 | Leavitt | F17C 13/003 356/402 |
| 2016/0121713 | A1 * | 5/2016 | Bauer | B62D 39/00 701/99 |
| 2017/0146192 | A1 * | 5/2017 | Newhouse | F17C 13/02 |
| 2017/0168021 | A1 | 6/2017 | Van Tooren et al. | |
| 2019/0145581 | A1 * | 5/2019 | Halvorsen | F17C 13/083 248/542 |
| 2021/0207773 | A1 * | 7/2021 | Pasquier | F17C 13/00 |

FOREIGN PATENT DOCUMENTS

| | | |
|---|---|---|
| JP | 2006-275223 | 10/2006 |
| KR | 2015-0022101 | 3/2015 |

OTHER PUBLICATIONS

Capineri Lorenzo et al.: "Ultrasonic Guided-Waves Sensors and Integrated Structural Health Monitoring Systems for Impact Detection and Localization: A Review", Sensors, Mar. 12, 2021 (Mar. 12, 2021), XP055911730, DOI: 10.20944/preprints202103.0347.v1, Retrieved from the Internet: URL:http://dx.doi.org/10.20944/preprints20_2103.0347.v1 [retrieved on Apr. 12, 2022].

Bakuckas J G et al.: "Monitoring Damage Growth in Tatanium Matrix Compsites Using Acoustic Emission (NASA-TM-I07742) Monitoring Damage Growth in Titanium Matrix Composites Using Acoustic Emission", Mar. 1, 1993 (Mar. 1, 1993) XP055925407, Retrieved from the Internet: URL:https://ntrs.nasa.gov/api/citations/19930015883/downloads/19930015883.pdf [retrieved on Jun. 24, 2022].

Fu Jia et al.: "Experimental Research on Rapid Localization of Acoustic Source in a Cylindrical Shell Structure Without Knowledge of the Velocity Profile", Sensors, vol. 21, No. 2, Jan. 13, 2021 (Jan. 13, 2021), p. 511, XP055935410, CH ISSN: 1424-8220, DOI: 10.3390/s21020511.

Feng Tianyi et al.: "Active Health Monitoring of Thick Composite Structures by Embedded and Surface-Mounted Piezo Diagnostic Layer", Sensors, vol. 20, No. 12, Jun. 17, 2020 (Jun. 17, 2020), p. 3410, XP055935417, DOI: 10.3390/s20123410.

Ren et al., PVDF Multielement Lamb Wave Sensor for Structural Health Monitoring, IEEE Transactions on Ultrasonics, Ferroelectrics, and Frequency Control, vol. 63, Issue: 1, Jan. 2016.

International Search Report and Written Opinion for Corresponding International PCT Patent Application No. PCT/IB2022/053186, filed Apr. 6, 2022.

* cited by examiner

COMPOSITE CYLINDER MONITORING SYSTEM

BACKGROUND

1. Field

This specification relates to a system and a method for monitoring composite laminate structures.

2. Description of the Related Art

Vehicles may be used to transport occupants and/or cargo. Some vehicles for transporting cargo are powered using fuel stored in cylinders. These cylinders may become damaged during operation of the vehicle. When the cylinders become damaged, it is important to repair the cylinders.

SUMMARY

What is described is a system for monitoring a composite cylinder. The system includes a plurality of sensors connected to the composite cylinder and configured to detect deformation data associated with the composite cylinder. The system also includes a controller communicatively coupled to the plurality of sensors. The controller is configured to determine a damage value based on the detected deformation data when the composite cylinder endures impact damage. The controller is configured to communicate a notification when the damage value exceeds an impact damage threshold which accounts and normalizes for wave propagation effects. The system also includes a filling controller communicatively coupled to the plurality of sensors. The filling controller can be configured to control a valve for filling the composite cylinder with a fluid. The filling controller is configured to detect damage progression of the composite cylinder as the composite cylinder is filled with the fluid, the damage detected based on the deformation data from the plurality of sensors. The filling controller is configured to automatically perform a safety action when the damage to the composite cylinder is detected.

Also described is a method for monitoring a composite cylinder. The method includes detecting, by a plurality of sensors connected to a composite cylinder, deformation data associated with the composite cylinder. The method also includes determining, by a controller communicatively coupled to the plurality of sensors, a damage value based on the detected deformation data when the composite cylinder endures impact damage. The method also includes communicating, by the controller, a notification when the damage value exceeds an impact damage threshold. The method also includes controlling, by a filling controller communicatively coupled to the plurality of sensors, a valve for filling the composite cylinder with a fluid. The method also includes detecting, by the filling controller, damage to the composite cylinder as the composite cylinder is filled with the fluid, the damage detected based on the deformation data from the plurality of sensors. The method also includes automatically performing a safety action when the damage to the composite cylinder is detected.

Also described is a system for continually monitoring a composite cylinder during operation. The system includes a plurality of piezoelectric sensors connected to a composite cylinder and configured to detect deformation data associated with the composite cylinder when the composite cylinder is impacted by an object and when the composite cylinder is filled with a fluid. The system also includes a controller communicatively coupled to the plurality of piezoelectric sensors and configured to determine a direct wave energy from the object based on the detected deformation data when the composite cylinder is impacted by the object, and communicate a notification when the damage value exceeds an impact damage threshold. The plurality of piezoelectric sensors are communicatively coupled to a filling controller configured to control a valve for filling the composite cylinder with the fluid, detect damage to the composite cylinder as the composite cylinder is stressed from internal pressure using a modal acoustic emission inspection, the damage detected based on the deformation data from the plurality of piezoelectric sensors, and automatically perform a safety action when the damage to the composite cylinder is detected.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for monitoring composite cylinders of a vehicle. The systems, vehicles, and methods disclosed herein automatically detect damage to the composite cylinder and take corresponding steps. The systems and methods described herein improve the safety of the vehicles using the composite cylinders, as the integrity of the composite cylinders is being continuously monitored, from use to filling (or re-filling).

While composite cylinders are discussed herein, the systems and methods may be adapted to a variety of contexts, such as wind turbines, fuselage, a leading edge of a wing, or any composite structure where impact damage is deleterious.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle. As used herein "cylinder" includes storage tanks, pressure vessels and other containers that can be used to store a gas and is not necessarily limited to a specific shape such as a right cylinder and/or a cylinder having a constant or unvarying circular shape in cross-section. As used herein, "fuel" or "gas" refers to any fluid used to power a vehicle, such as gaseous fuel or liquid fuel.

Figure 1:
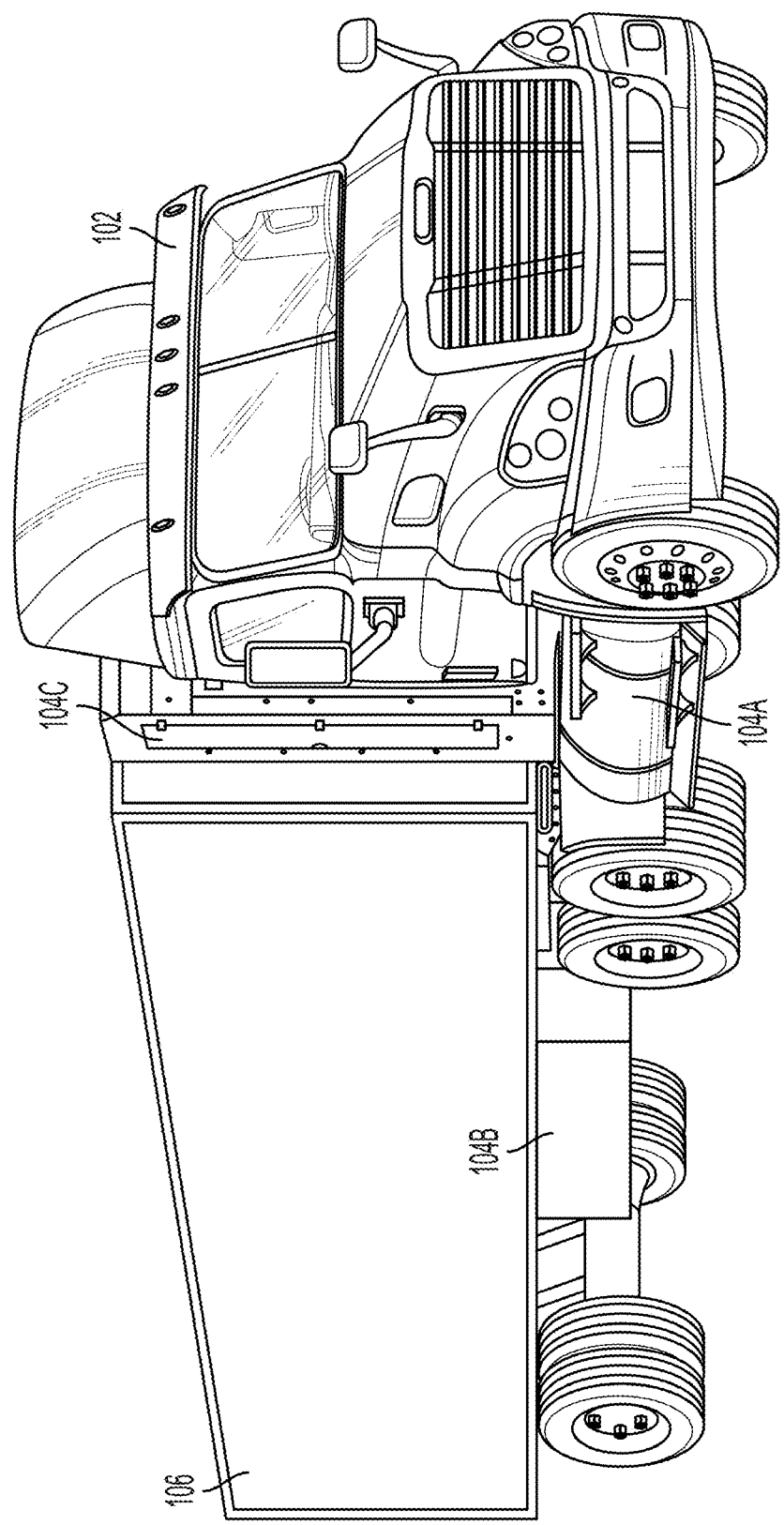
FIG. 1 illustrates a vehicle having composite cylinders storing fuel to power the vehicle, according to various embodiments.

FIG. 1 illustrates a vehicle 102. In particular, the vehicle 102 is a tractor configured to couple to and pull a trailer 106. The vehicle 102 may be powered using fuel stored in a composite pressure cylinder (or "composite cylinder" or "cylinder"). For example, the fuel may be compressed natural gas stored in a composite cylinder.

The cylinder may be part of a gas cylinder assembly. The gas cylinder assembly is in fluid communication with and supplies fuel to an engine or any other power generation system of the vehicle 102. The vehicle 102 may be a car, a wagon, a van, a bus, a high-occupancy vehicle, a truck, a tractor trailer truck, a heavy-duty vehicle such as a garbage truck or any other vehicle. In some embodiments, a gas cylinder assembly is configured for use in a ship, an airplane and a mobile or stationary fuel station.

The fuel cylinders may be stored in a compartment or housing 104A on the sides of the vehicle 102, in a compartment or housing 104B on the trailer 106, or in a compartment or housing 104C behind the cab of the vehicle 102, for example. In some embodiments, the fuel cylinders may be stored on a rooftop or mounted to a tailgate of a vehicle.

Field failures of composite pressure cylinders are derived primarily from three root causes: thermal exposure events, impact damage, or cumulative damage that is deleterious to the composite laminate. While thermal exposure may be mitigated, no systems or methods exist (commercially available or otherwise) that protect composite pressure cylinders against impact damage (e.g., a car crash), or cumulative damage accumulated due to an improper operational condition (e.g., improper installation, or debris caught between a cylinder and an enclosure). Experience has shown that when a cylinder has experienced impact damage of a sufficiently significant level or accumulated latent damage due to improper environmental conditions (e.g., bolt caught between the cylinder and the enclosure), catastrophic failure of the cylinder occurs on subsequent filling cycle(s) when the stress state within the laminate exceeds a critical level.

Figure 2A:
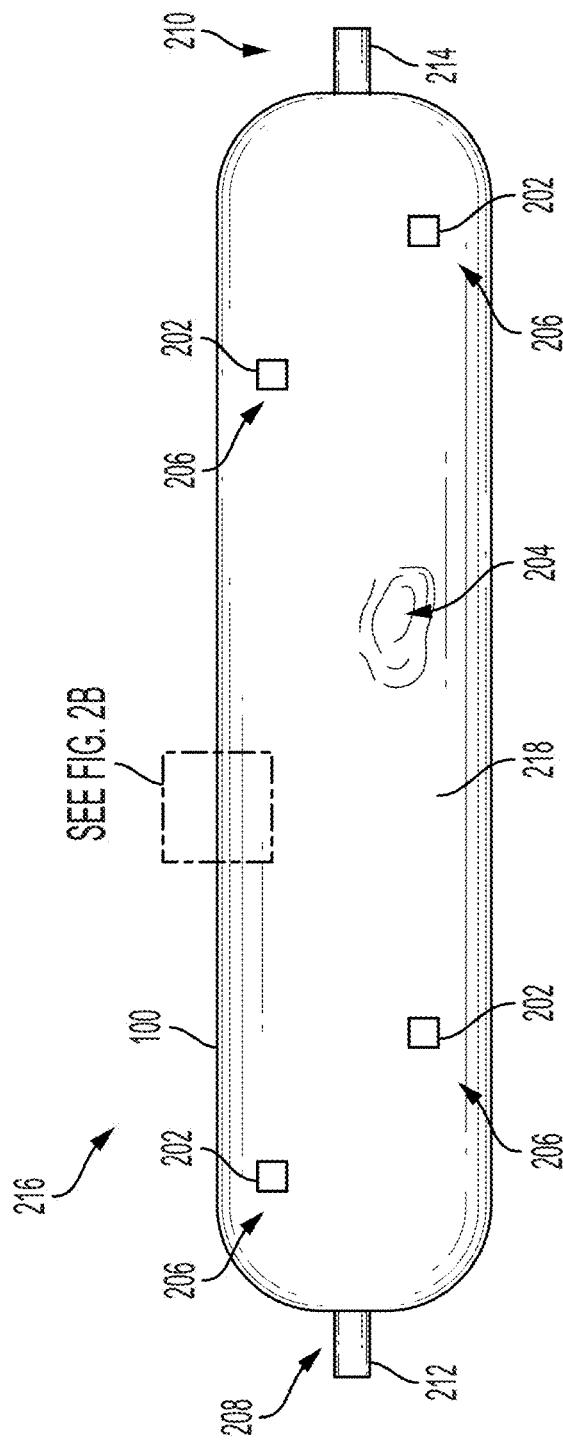
FIGS. 2A-2B illustrate a composite cylinder, according to various embodiments.

FIG. 2A illustrates a cylinder 100 configured to store a fluid, such as compressed natural gas or hydrogen. Cylinder 100 may be formed of a metal such as steel, aluminum, glass fiber, carbon fiber, polymer, or a composite material such as carbon fiber reinforced polymer, another suitable material, or a combination thereof. For example, the cylinder 100 may include an inner liner made of gas-tight, polyethylene plastic that has a high-pressure carbon fiber reinforced plastic structure located over the inner liner. In another example, the cylinder 100 may include a metal liner that is wrapped by a composite or fiber resin.

Figure 2B:
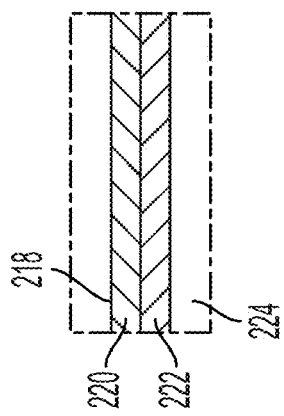

FIG. 2B illustrates a side cross-sectional view of the cylinder 100. The cylinder 100 may have a plurality of layers. For example, the cylinder 100 may have an inner layer 222 and an outer layer 220. The inner layer 222 may be made of metal or plastic or any other rigid material. The outer layer 220 may be made of a composite or fiber resin that is disposed on top of the inner layer 222 during the manufacturing process. The outside of the outer layer 220 may define an outer surface 218 of the cylinder 100. The walls of the cylinder 100 may define an interior cavity 224 for storage of the fuel. While two layers (e.g., inner layer 222 and outer layer 220) are shown in FIG. 2B, any number of layers may be used to form the cylinder 100.

Referring back to FIG. 2A, the cylinder 100 includes a central portion 216 and two end portions 208, 210. The central portion 216 may be a cylindrical tubular shape or any other shape. In some embodiments, each of the two end portions 208, 210 includes a dome structure, as shown in FIG. 2A. In some embodiments, the two end portions are symmetrical to each other. The dome structure may be generally hemispherical at least at the end portions thereof. In some embodiments, two end portions 208, 210 have different shapes such that the cylinder 100 is of an asymmetrical shape.

In some embodiments, the cylinder 100 includes at least one neck 212, 214 (e.g., a longitudinal projection of a boss) that provides an inlet and/or an outlet of an internal volume of the cylinder 100. In some embodiments, the cylinder 100 includes necks 212, 214 formed at both of the end portions 208, 210. In some embodiments, a neck can be formed only one of the two end portions 208, 210. In some embodiments, the neck 212, 214 can be part of a metallic structure, sometimes referred to as a boss, that is formed through a first end portion of an internal pressure enclosure, which is sometimes referred to as an inner liner assembly or simply a liner of the cylinder 100.

The neck 212, 214 can be made of any number of materials, such as metal. In some embodiments, the neck 212, 214 is formed using one or more materials not used for the internal pressure enclosure. In certain embodiments, the neck 212, 214 is made of the same material as the internal pressure enclosure.

The cylinder 100 may have an outer surface 218 that spans the body of the cylinder 100. In some embodiments, the outer surface 218 includes the neck 212, 214. In other embodiments, the outer surface 218 does not include the neck 212, 214. As described herein, damage may be experienced by the cylinder 100. The damage may be a result of a collision between the cylinder 100 and an object, such as a rock or another vehicle. The damage may be a result of an object, such as a bolt, being trapped between the cylinder 100 and a housing of the cylinder 100 (e.g., housing or compartment 104) and damaging the cylinder 100 when the cylinder 100 expands based on pressure or temperature changes. In some situations, the damage may result in a visible dent 204, but in many other situations, the damage may not result in a visible dent. This damage that is not easily visible to a human eye may be as damaging to the cylinder 100 as visible dents. The systems and methods described herein prevent re-use of cylinders that have damage, including cylinders with damage that is not easily visible to the human eye.

The cylinder 100 may have a plurality of sensors 202 attached to the cylinder 100 at various sensor locations 206. The sensors 202 are configured to detect an impact to the cylinder 100. The sensors 202 may be broadband piezoelectric sensors which are sensitive to the out-of-plane displacement component of the laminate of a composite pressure cylinder (e.g., cylinder 100). The sensors 202 may be utilized to detect and establish the energy level of an impact event. The broadband piezoelectric sensors utilize a piezoelectric material in communication with the composite laminate to measure stress waves caused by impact or progressive damage accumulation within the laminate. In some embodiments, the broadband piezoelectric sensors used herein do not necessarily rely on measurement of a shift in resonant or anti-resonant frequency caused by a change in stress state in the piezoelectric material to detect a damage in the composite laminate. In some embodiments, the broadband piezoelectric sensors used herein intentionally do not use measurement of a shift in resonant or anti-resonant frequency caused by a change in stress state in the piezoelectric material to detect a damage in the composite laminate.

The sensors 202 may be considered passive sensors in that one or more of the sensors do not actively emit a wave to be detected by one or more other sensors. Instead, the sensors 202 are used to determine when, where on the tank, and to what severity an impact event occurred, as well as passively monitoring the laminate as the laminate is stressed from an external source.

In some embodiments, the sensors 202 are removably attached to the cylinder 100. In other embodiments, the sensors 202 are integrally formed and embedded within the cylinder 100. The sensors 202 may be located on the outer surface 218 or may be located within (or between) layers of the cylinder 100. In some embodiments, the sensors 202 may be located in an inner surface within the interior cavity 224 of the cylinder 100.

The sensors 202 may be located at sensor locations 206 that are known, and the data detected by the sensors, along with the sensor locations 206 on the cylinder 100, may be used to determine the location of any detected damage, such as dent 204. While four sensors 202 are shown, any number of sensors may be used. In many situations, the use of more sensors 202 results in more accurate determinations of the location of the damage and magnitude of the damage.

Figure 3A:
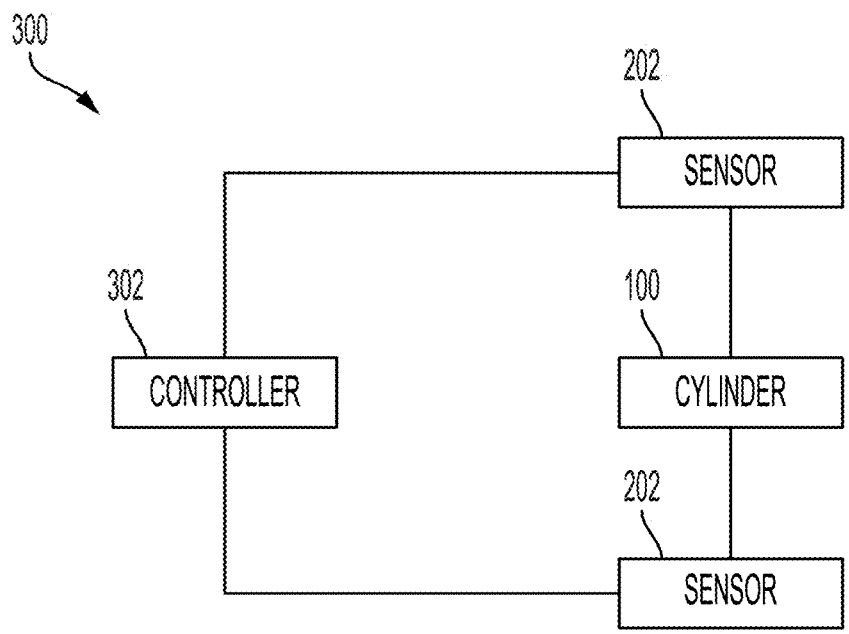
FIGS. 3A-3B illustrate block diagrams of monitoring components of the system, according to various embodiments.

FIG. 3A illustrates a block diagram of components that may be coupled to the cylinder 100. The system 300 includes a cylinder 100 and sensors 202, as described herein. The sensors 202 are physically coupled to the cylinder 100, also as described herein.

The sensors 202 may be communicatively coupled to a controller 302 (or "cylinder controller" or "cylinder-side controller" or "impact monitoring controller"). The sensors 202 may be configured to detect deformation data associated with an impact received (or experienced) by the cylinder 100. As used herein, "deformation data" may be used to refer to the deformation of the cylinder 100. In this regard, "disturbance data," "impact data," or "cylinder integrity data," among others, may be used interchangeably with "deformation data."

The deformation data may be provided to the controller 302. The controller 302 may be a computer processor, microprocessor, control unit, or any device configured to execute instructions stored in non-transitory memory. The controller 302 may be located in a housing that is physically coupled to the cylinder 100 (e.g., located directly on the cylinder 100, on a housing of the cylinder 100, or on a device coupled to the cylinder 100). As shown in FIG. 3A, the controller 302 is configured to monitor only the cylinder 100, such that if the vehicle 102 uses multiple cylinders, each cylinder 100 has its own array of sensors 202 and its own respective controller 302.

The sensors 202 may be communicatively coupled to the controller 302 via wires, or in a wireless manner, using respective transceivers (e.g., a transceiver for each sensor 202 and a transceiver for the controller 302). While two sensors 202 are shown, any number of sensors 202 may be included in the system 300, and each sensor 202 may be communicatively coupled to the controller 302.

The controller 302 may receive the deformation data detected by the sensors 202 and detect whether an impact event has been experienced by the cylinder 100 and determine an energy level of the impact event. In some embodiments, the controller 302 digitizes the deformation data detected by the sensors 202 in order to detect whether the impact event has been experienced by the cylinder 100 and determine the energy level of the impact event.

Figure 3B:
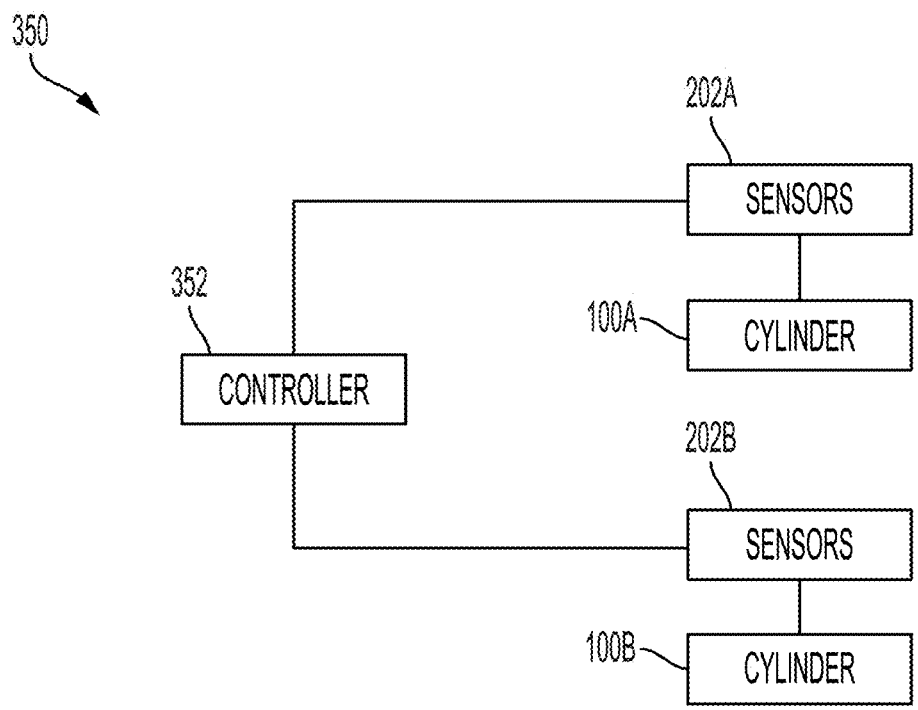

FIG. 3B illustrates a block diagram of components that may be coupled to cylinders 100 (e.g., cylinder 100A and cylinder 100B). The system 350 includes a plurality of cylinders 100 and sensors 202 (e.g., sensors 202A and sensors 202B), as described herein. The sensors 202 are physically coupled to their respective cylinder 100, also as described herein.

The sensors 202 may be communicatively coupled to a controller 352 similar to controller 302. The sensors 202 may be configured to detect deformation data associated with an impact received (or experienced) by the cylinder 100. The deformation data may be provided to the controller 352. The controller 352 may be a computer processor, microprocessor, control unit, or any device configured to execute instructions stored in non-transitory memory. The controller 352 may be located in a housing that is physically coupled to the cylinders 100 (e.g., located directly on one of the cylinders 100, on a housing of the cylinders 100, or on a device coupled to the cylinders 100). As shown in FIG. 3B, the controller 352 is configured to monitor cylinder 100A and cylinder 100B, such that if either cylinder 100A or cylinder 100B were impacted, the controller 352 could detect the impact.

The sensors 202 may be communicatively coupled to the controller 352 via wires, or in a wireless manner, using respective transceivers (e.g., a transceiver for each sensor 202 and a transceiver for the controller 352). While two sets of sensors 202 and cylinders 100 are shown, any number of sets of sensors 202 and cylinders 100 may be included in the system 350, and each set of sensors 202 may be communicatively coupled to the controller 302.

The controller 352 may receive the deformation data detected by the sensors 202 and detect whether an impact event has been experienced by the cylinder 100 and determine an energy level of the impact event. The data received from the sensors 202 may include an identification of which cylinder 100 the data is associated with. For example, each sensor 202 may be associated with an identifier, and the identifier may be communicated by the sensor 202 along with the deformation data to the controller 352.

In some embodiments, the controller 302, 352 is a separate controller from a controller of the vehicle 102 (e.g., an electronic control unit) or a controller of any other subsystem of the vehicle 102. In other embodiments, the controller 302, 352 is a controller of the vehicle 102 configured to control one or more other vehicle systems.

Figure 4:
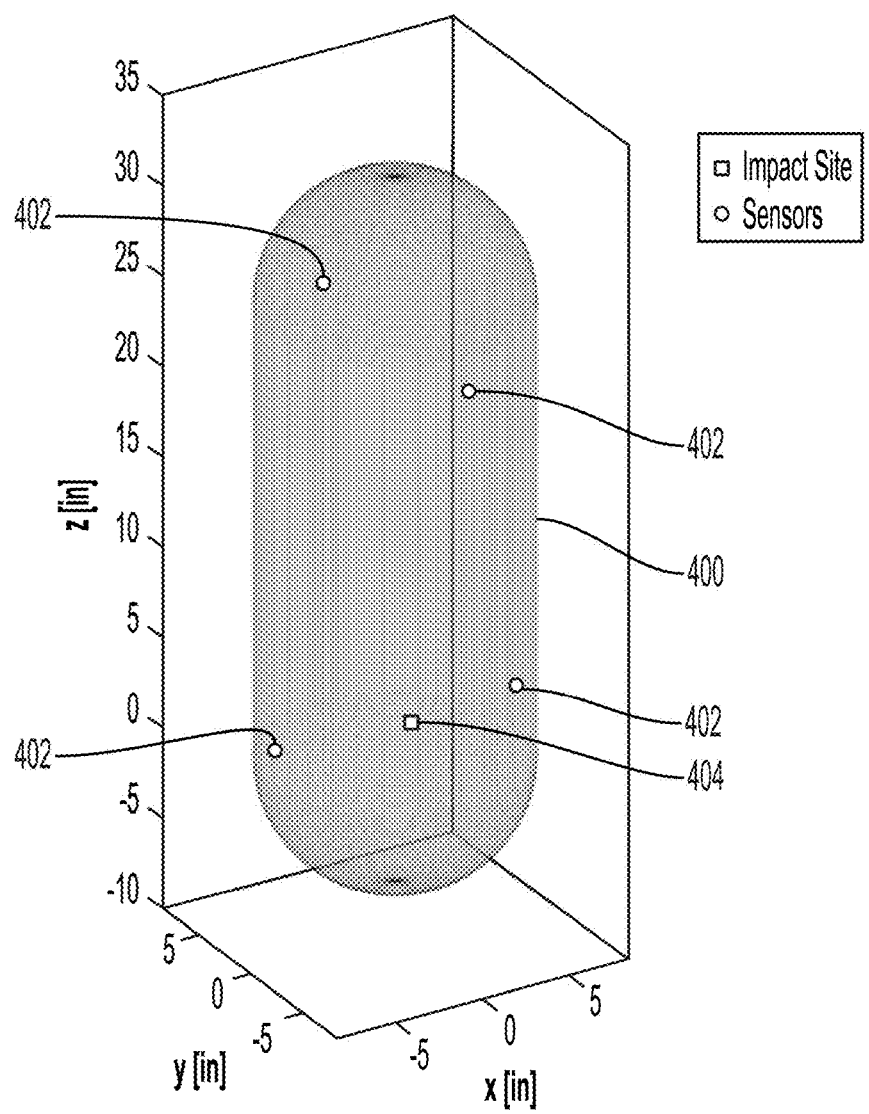
FIG. 4 illustrates a model of the cylinder, sensors, and impact site, according to various embodiments.

FIG. 4 illustrates a model 401 of a cylinder and sensors configured to detect deformation data. The model 401 may be constructed by a controller (e.g., controller 302, 352) communicatively coupled with sensors (e.g., sensors 202). The cylinder 400 of the model 401 is similar to the real-world cylinder 100. In some embodiments, the controller is provided with an identification associated with the cylinder 100, and dimensions associated with the cylinder 100 may be accessed from a local or remote non-transitory memory. In some embodiments, the controller is provided with the dimensions of the cylinder 100.

The sensors 402 of the model 401 are similar to the real-world sensors 202. The controller is provided with the locations of the real-world sensors 202 on the real-world cylinder 100, and the controller identifies corresponding locations for the model sensors 402 on the model cylinder 400. While four sensors 402 are shown, any number of sensors may be used. In many situations, the use of more sensors 402 results in more accurate determinations of the location of the damage and magnitude of the damage.

In experiments conducted using the systems and methods described herein, broadband piezoelectric sensors were coupled to the surface of a 353 mm diameter×889 mm long 250 bar Type 4 composite pressure cylinder, as modeled by the cylinder 400 and the sensors 402.

The instrumented cylinder was then impacted (shown in the modeled impact site 404) with a hemispherical 50 mm diameter TUP at an energy level of 600 J, and the out-of-plane displacement component stress waves which propagated were captured and digitized for location and energy quantification analysis.

Figure 5:
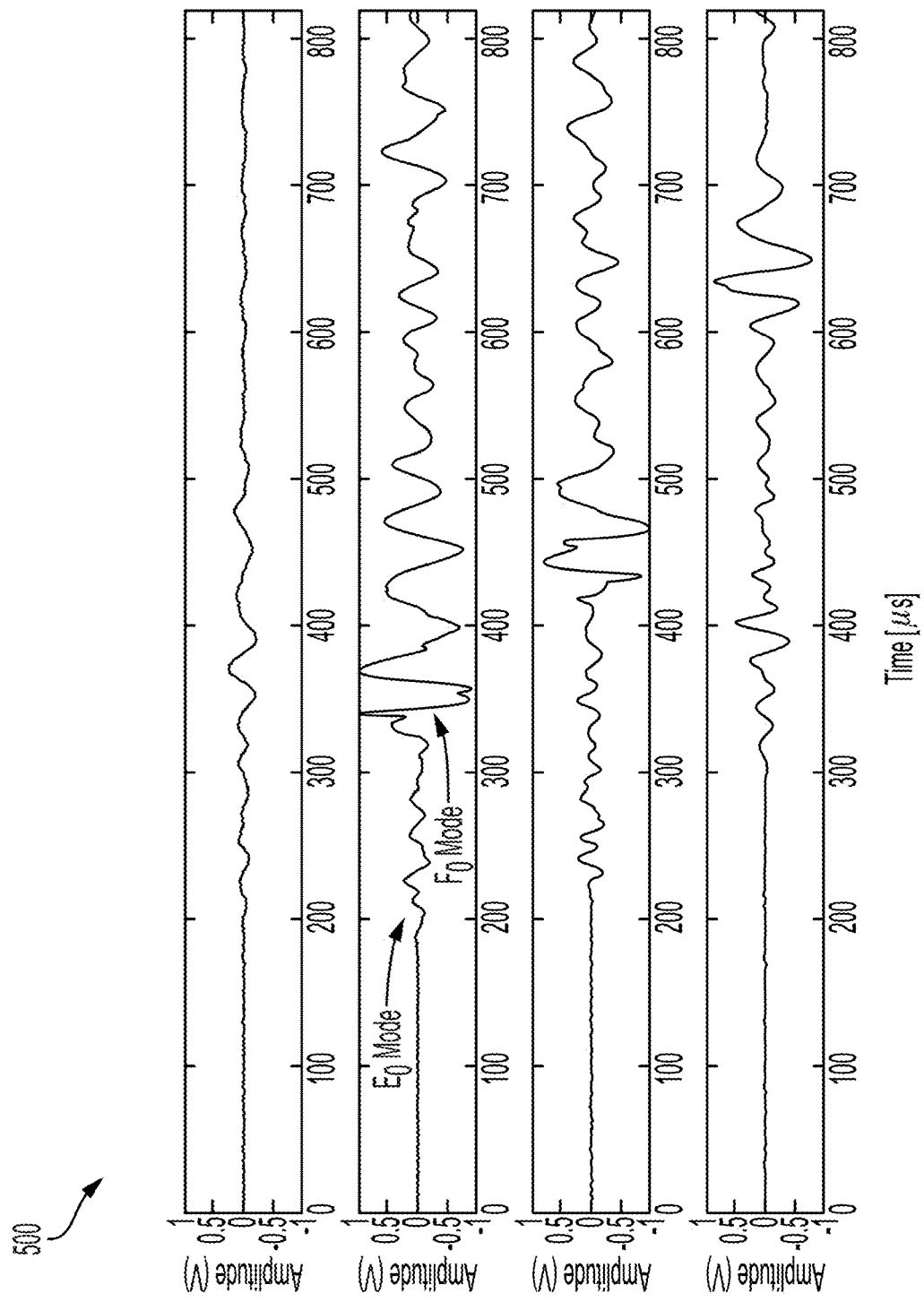
FIGS. 5 and 6 illustrate sensor data of the system, according to various embodiments.

FIG. 5 illustrates graphs 500 of the captured waveforms from an exemplary impact event, from which it can be observed that guided stress waves propagated as a result of the impact event.

Each graph having a respective trace corresponds to a sensor 202 and shows the amplitude (or out-of-plane displacement) detected by each sensor over time. The propagation of the waves is dictated by guided mode wave propagation. The extensional mode, labeled $E_0$, is followed by a larger amplitude flexural mode, labeled $F_0$. The different modes have different velocities and the modes are composed of broad frequency bandwidths. Thus, determining the common frequency component of the same mode for each sensor channel to determine the arrival time of the wave at each sensor is not an obvious proposition.

Figure 6:
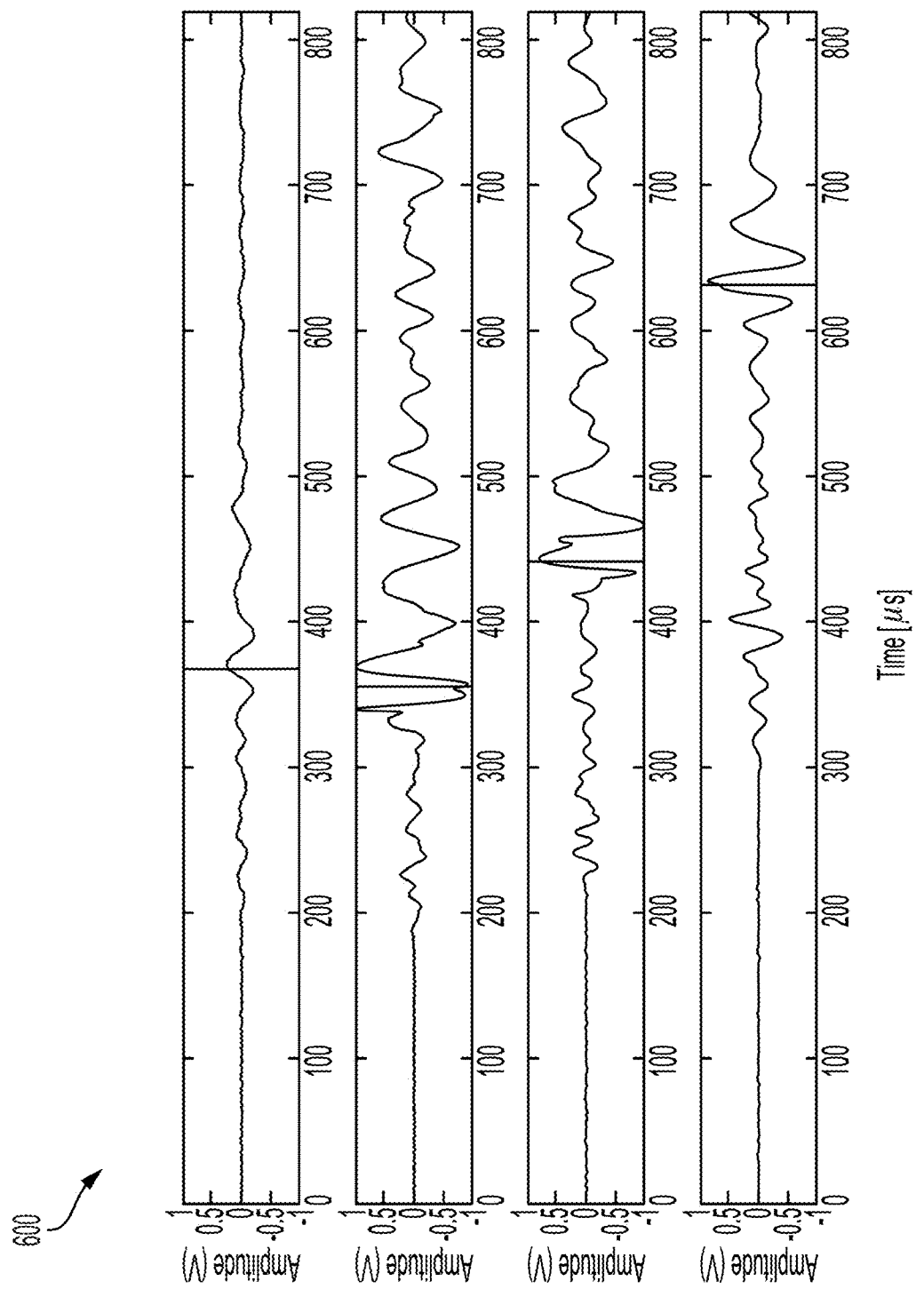

FIG. 6 illustrates graphs 600 showing the identification of the direct arrival time of the 25 kHz component of the fundamental flexure wave (identified by the vertical line) on each channel using a threshold independent arrival time estimation technique. The direct arrival time at each sensor channel is used as an input in a source location determination algorithm to determine the geodesic curves of a curvilinear surface.

More specifically, an optimal source location on the cylinder surface may then be computed with knowledge of the group velocity of the 25 kHz component of the fundamental flexure wave mode derived from knowledge of the dispersion relations of the laminate, discretization of the cylinder surface into N points, a computation of the geodesic propagation distance from the ith point on the cylinder to the jth transducer, and minimizing the sum of squared error in differences of computed inter-channel arrival time differences and the physically measured arrival time differences.

Figure 7:
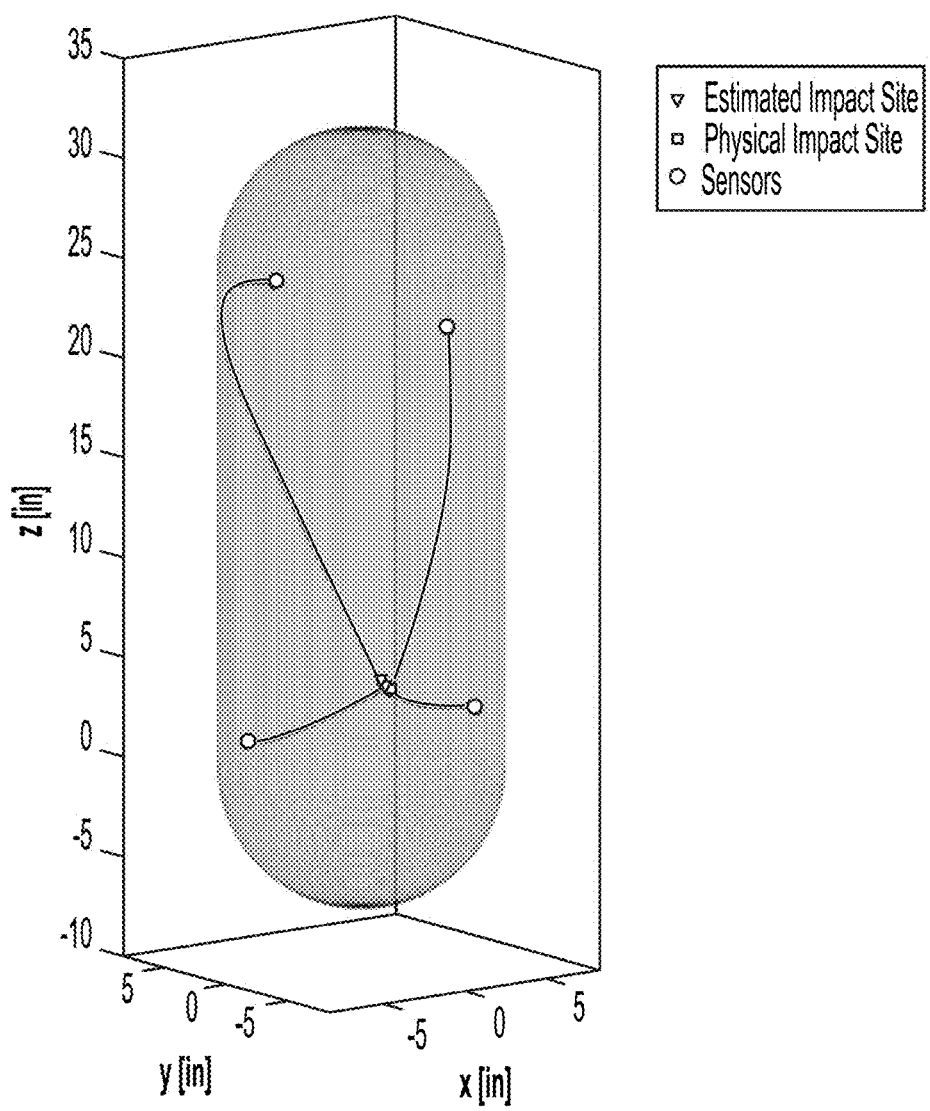
FIG. 7 illustrates a model of the cylinder, sensors, and estimated impact site, according to various embodiments.

FIG. 7 illustrates a model with an identification of the optimal source location estimation (with geodesic paths overlaid on the cylinder surface) for the impact event observed in FIG. 6. Once the location is determined, the direct arrival time of the wave from the location of impact to each sensor may be determined. This direct arrival time is used the determination of the measure direct waveform energy, described below.

The systems and methods described herein quantify the calculation of direct waveform energy. A computation of the measured direct waveform energy ($U_{WAVE}$) may be computed from the captured waveforms as $U_{WAVE} = \int_0^{t_{DIRECT}} V^2 \, dt$, where $t_{DIRECT}$ represents the direct arrival time of the slowest moving wave component for wave propagation from the estimated source location to the sensor under consideration and V represents voltage detected at each sensor (e.g., piezoelectric sensor).

The systems and methods described herein use the direct energy, as other quantifications of energy may also include wave reflections or alternative (longer) arrival paths of wave energy spread from the impact that may constructively amplify with other waves, resulting in an inaccurate quantification of the detected impact. For example, quantifications of energy focused on an amplitude assessment are not as accurate as the systems and methods described herein, as propagating waves may combine constructively or destructively, such that assessing amplitude does not result in an accurate assessment of the wave energy. In comparison, by using direct wave energy, the systems and methods described herein mitigate reflections and wrapping waves. The normalization procedure described herein accounts for energy loss as a function of propagation distance due to geometric spreading of the wavefront as it propagates out from a source.

Figure 8:
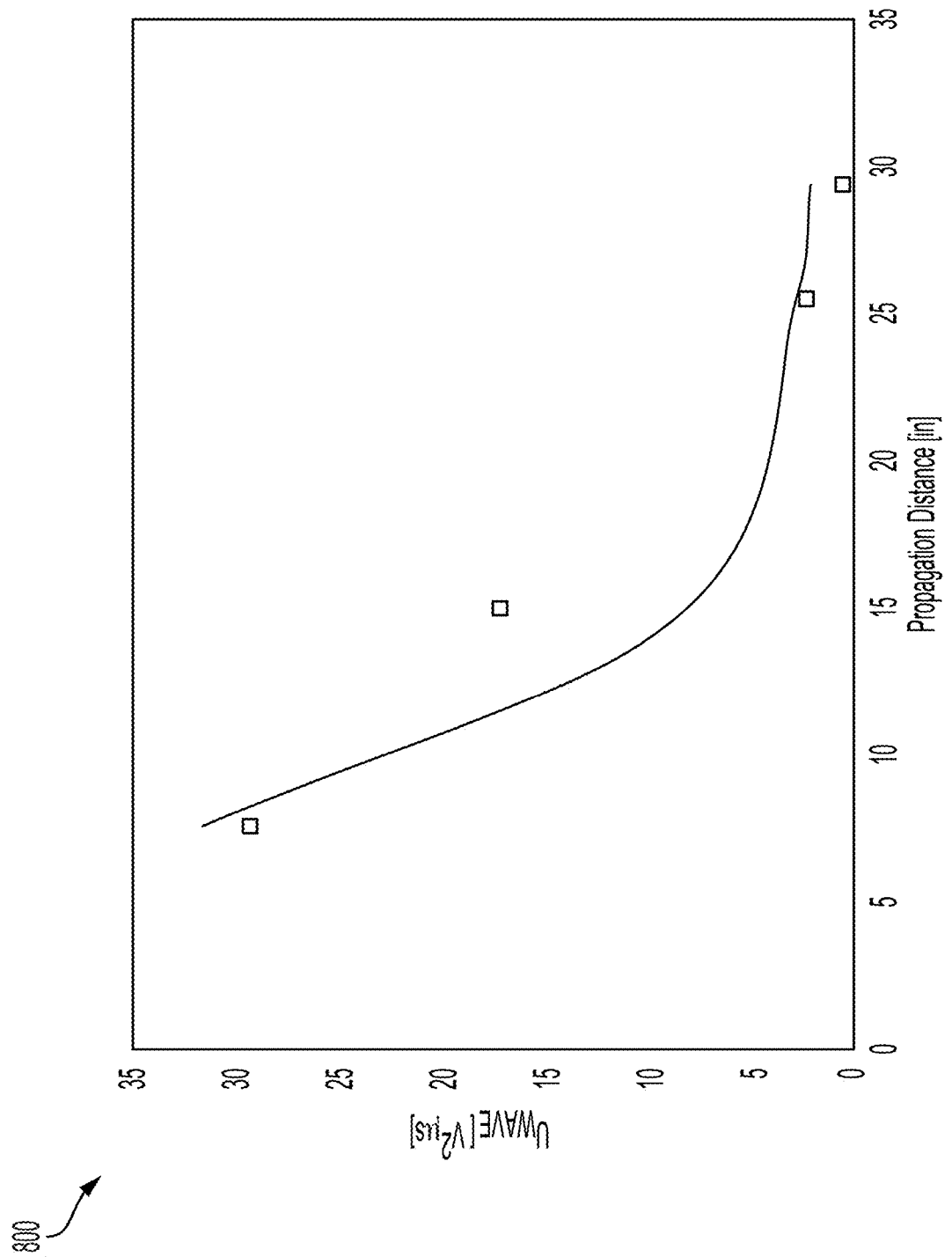
FIG. 8 illustrates data of the system, according to various embodiments.

In FIG. 8, it is shown that measured direct wave energy (caused by an impact event) decays in the far-field following a modified inverse square law, allowing a quantitative assessment of impact energy severity as measured from wave energy. Thus, based on the propagation distance, an impact energy can be established and evaluated against a threshold for a given cylinder construction. The systems and methods described herein detect an event above a threshold and also normalize for every real-world wave propagation effect that can occur. This normalization reduces the number of false triggers, enhancing reliability of the system. As described herein, normalization accounts for amplitude and energy loss due to geometric spreading from source to sensor distance, as well as other attenuation effects.

If the quantitative assessment of the impact energy severity exceeds an impact damage threshold (e.g., a predetermined laminate impact energy threshold), the controller 302, 352 is configured to provide an indication that damage has been experienced by the cylinder 100. The indication may be provided to any number of devices, such as an ECU of the vehicle 102, a local non-transitory memory, or a remote non-transitory memory.

When the indication is provided to an ECU of the vehicle 102, the ECU of the vehicle 102 may instruct a light or other notification indicator to be illuminated, such as a light on a dashboard of the vehicle 102 or an instrument panel of the vehicle 102. The light or other notification may serve as a reminder to inspect the cylinder 100 prior to refilling the cylinder 100.

When the indication is provided to a local non-transitory memory, the controller 302, 352 may update, on the local non-transitory memory, a state indication associated with each of the cylinders 100 of the vehicle 102, and the state indication may be changed from a first state corresponding to a non-damaged condition of the cylinder to a second state corresponding to a potentially damaged condition of the cylinder. The local non-transitory memory may be accessed by another device (e.g., a filling device) to determine whether the cylinder 100 should be inspected prior to refilling, and when the local non-transitory memory indicates that the state of the cylinder is in the second state, the filling device (or other device) may provide a corresponding indication to the operator, or the filling device may automatically prevent filling of the cylinder 100.

Similarly, when the indication is provided to a remote non-transitory memory, the controller 302, 352 may update, on the remote non-transitory memory, a state indication associated with each of the cylinders 100 of the vehicle 102, and the state indication may be changed from a first state corresponding to a non-damaged condition of the cylinder to a second state corresponding to a potentially damaged condition of the cylinder. The remote non-transitory memory may be accessed by another device (e.g., a filling device) to determine whether the cylinder 100 should be inspected prior to refilling, and when the remote non-transitory memory indicates that the state of the cylinder is in the second state, the filling device (or other device) may provide a corresponding indication to the operator, or the filling device may automatically prevent filling of the cylinder 100. The remote non-transitory memory may be accessed by the controller 302, 352 using respective transceivers (e.g., a transceiver coupled to the controller 302, 352 and a transceiver coupled to the remote non-transitory memory).

In the event that an impacted cylinder 100 with compromised strength were to be refilled, the same sensors 202 used to detect the impact may also be used to perform a Modal Acoustic Emission (MAE) inspection to detect a loss of cylinder integrity during refilling.

Figure 9:
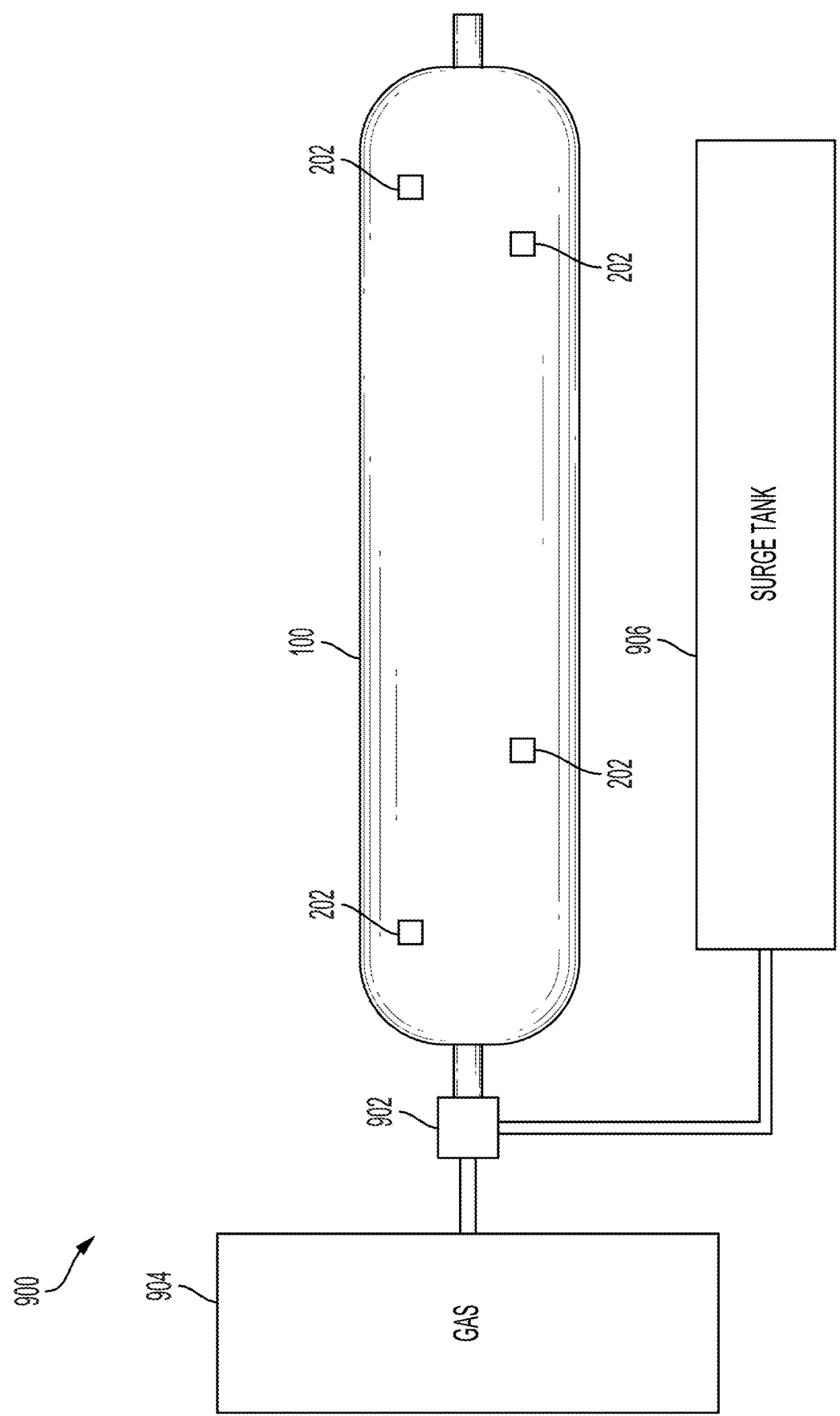
FIG. 9 illustrates a block diagram of components for filling a cylinder, according to various embodiments.

FIG. 9 illustrates a system 900 including the cylinder 100 coupled to a filling device. The filling device may include a valve 902 and a supply tank 904. The valve 902 may be automatically controlled by a controller to control filling of the cylinder 100 with gas stored in the supply tank 904. In some situations, the cylinder 100 may remain attached to the vehicle 102 during filling.

During the filling of the cylinder 100, the contents of the cylinder 100 apply internal outward pressure to the cylinder shell and induce mechanical stress within the composite laminate of the cylinder 100. If the composite laminate had been materially degraded due to damage, as described herein, the affected volume of material will fail via numerous damage mechanisms associated with composite pressure cylinders (e.g., fiber fracture, matrix cracking, interfacial failure, etc.). As the damage mechanisms occur, stress waves propagate out from the origin of the damage mechanism site into the wall of the cylinder 100. The sensors (e.g., broadband piezoelectric sensors) 202 detect the deformation data associated with these damage mechanisms by transducing stress waves into a voltage digitally captured for analysis.

When damage during filling is detected, one or more steps may be taken to mitigate harm from a breached cylinder. A visual alert, such as a light or a displayed message may be triggered. An audible alert, such as a siren or alarm may be triggered. The valve 902 may be automatically shut off to prevent further filling of the cylinder with gas.

In some embodiments, gas from the supply tank 904 and/or the cylinder 100 may be routed to a surge tank 906 by selectively opening and closing one or more ports between the supply tank 904, the cylinder 100, and the surge tank 906. For example, the valve 902 may be capable of opening and closing a port coupled to the supply tank 904, a port coupled to the cylinder 100, and a port coupled to the surge tank 906. Any combination of ports may be selectively opened and closed. For example, during filling, the ports for the supply tank 904 and the cylinder 100 may be opened and the port for the surge tank 906 may be closed. In another example, in the event of a detected breach of the cylinder 100, the ports for the cylinder 100 and the surge tank 906 may be opened and the port for the supply tank 904 may be closed.

In some embodiments, the surge tank 906 has a lower pressure than the cylinder 100, so the gas may be compelled to travel to the surge tank 906 if a port between the surge tank 906 and the cylinder 100 is opened. In some embodiments, a suction or pressure may be applied to the gas to compel the gas to move from the cylinder 100 to the surge tank 906. A vent stack may also be present to facilitate movement of the gas.

Modal Acoustic Emission analysis algorithms of the digitally captured waveforms may be focused on at least one of: the detection and quantification of fiber tow fracture above a specified threshold, the measurement of instability within a local volume of material above a specified threshold, damage mechanisms being accumulated in a localized volume of material above a specified threshold, and/or the detection of fretting emission above a specified threshold for a given cylinder laminate.

When combinations of the above are used together for detection of a compromised cylinder during filling, the factors may be weighted based on various characteristics of the fuel system, including the cylinder and dimensions and construction thereof. For example, a combination of fretting emission and localized growth may be used to determine whether a particular cylinder is compromised during filling, the fretting emission being weighted more heavily than the localized growth.

Figure 10:
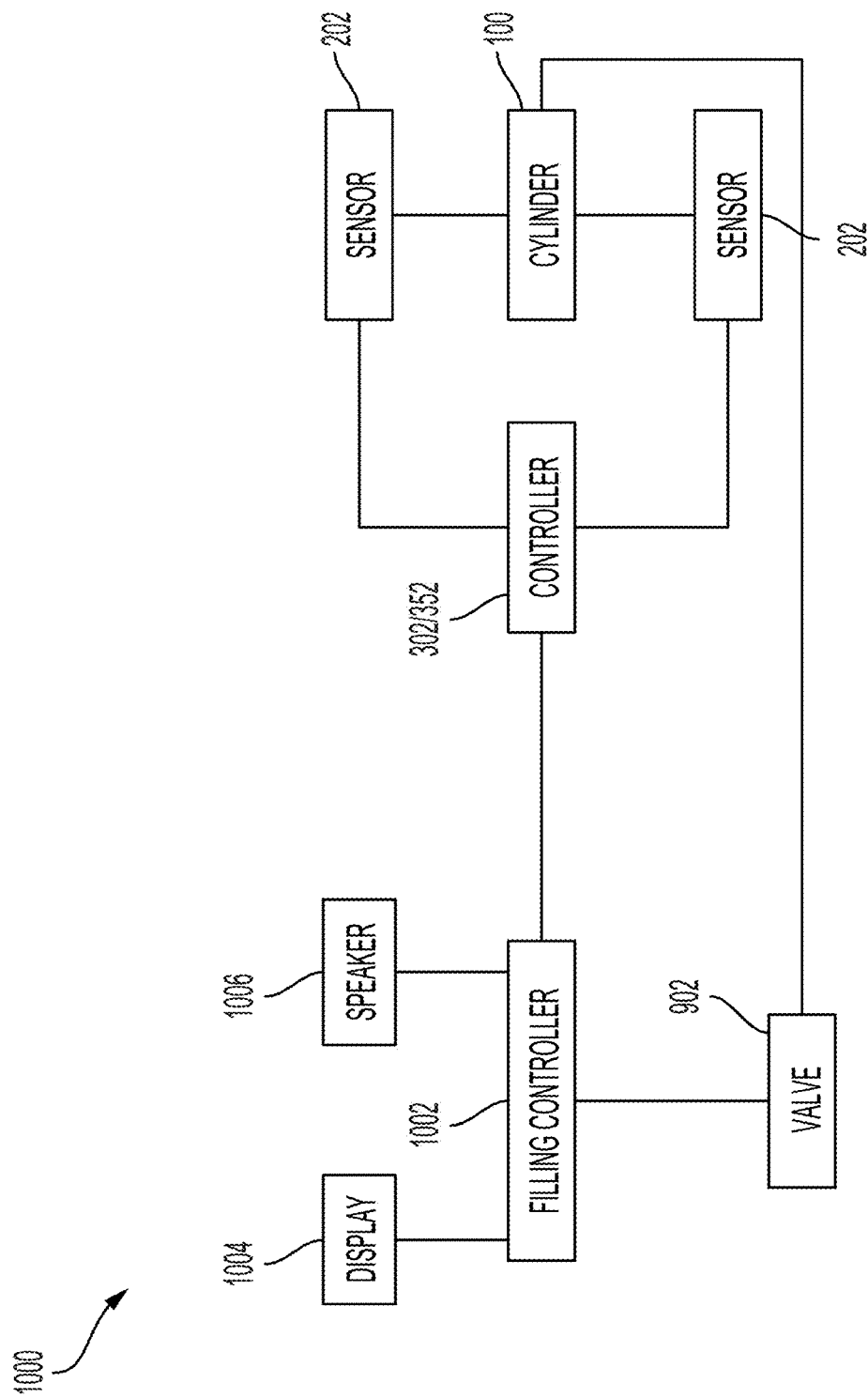
FIG. 10 illustrates a block diagram of components for monitoring and filling a cylinder, according to various embodiments.

FIG. 10 illustrates a block diagram of a system 1000. The system 1000 includes the cylinder 100, sensors 202, and controller 302, as described herein.

The controller 302 may be communicatively coupled to a filling controller 1002 (or "filling device controller" or "filling-side controller"). The controller 302 may be communicatively coupled to the filling controller 1002 in a wired or wireless manner. The filling controller 1002 may also be communicatively coupled to a valve 902 that controls flow of fuel during refilling of the cylinder 100.

The filling controller 1002 may obtain the state of the cylinder 100 from the controller 302, from an ECU of the vehicle 102, from a local non-transitory memory, and/or a remote non-transitory memory, as described herein.

The filling controller 1002 may also be communicatively coupled to a display 1004 and a speaker 1006. The filling controller 1002 may be configured to render a graphical user interface displayed by the display 1004. The graphical user interface may include notifications of whether the cylinder 100 should be inspected prior to filling, and the display 1004 may display these notifications. The filling controller 1002 may also be configured to provide a notification of whether the cylinder 100 should be inspected prior to filling using the speaker 1006. The speaker 1006 may emit a noise, alarm, spoken words (e.g., "Inspect the cylinder prior to filling"), or any other indication.

In some embodiments, the filling controller 1002 may not be aware of the state of the cylinder 100 and may perform the functions described herein without regard to the current status of the cylinder 100.

As the cylinder 100 is being filled with fuel, the sensors 202 may detect deformation data and provide the detected deformation data to the filling controller 1002. In some embodiments, the sensors 202 are communicatively coupled to the filling controller 1002 via the controller 302. In some embodiments, the sensors 202 are directly communicatively coupled to the filling controller 1002 using respective transceivers or a wired connection.

The filling controller 1002 receives the detected deformation data and detects damage to the cylinder 100 caused by the cylinder 100 being filled, and when the detected damage exceeds a threshold, the filling controller 1002 may automatically close the valve 902 to prevent further filling of the cylinder 100. In some embodiments, the filling controller 1002 always monitors the cylinder 100 using the sensors 202 during filling for detection of a breach of the integrity of the cylinder 100. In some embodiments, the filling controller 1002 only monitors the cylinder 100 using the sensors 202 during filling when the controller 302, 352 had detected damage that exceeds an impact damage threshold based on quantification of the direct energy of the impact.

As described herein, when the filling controller 1002 receives the detected deformation data and detects damage to the cylinder 100 caused by the cylinder 100 being filled, a surge tank (e.g., surge tank 906) may be used to receive the fuel.

Although the same sensors 202 are used by the controller 302, 352 and the filling controller 1002, the controller 302, 352, is configured to detect an impact caused by an external force onto the cylinder 100, and the filling controller 1002 is configured to detect damage to the cylinder 100 caused by the expansion of the cylinder 100 during filling, which may rupture due to previously weakened or deformed areas (e.g., areas where an impact was experienced).

In experiments conducted using the systems and methods described herein, broadband piezoelectric sensors were coupled to the surface of a 353 mm diameter×889 mm long 250 bar Type 4 composite pressure cylinder, as modeled by the cylinder 400 and the sensors 402 of FIG. 4. These same sensors were used during a simulated fill to demonstrate the MAE inspection of a degraded cylinder.

Figure 11:
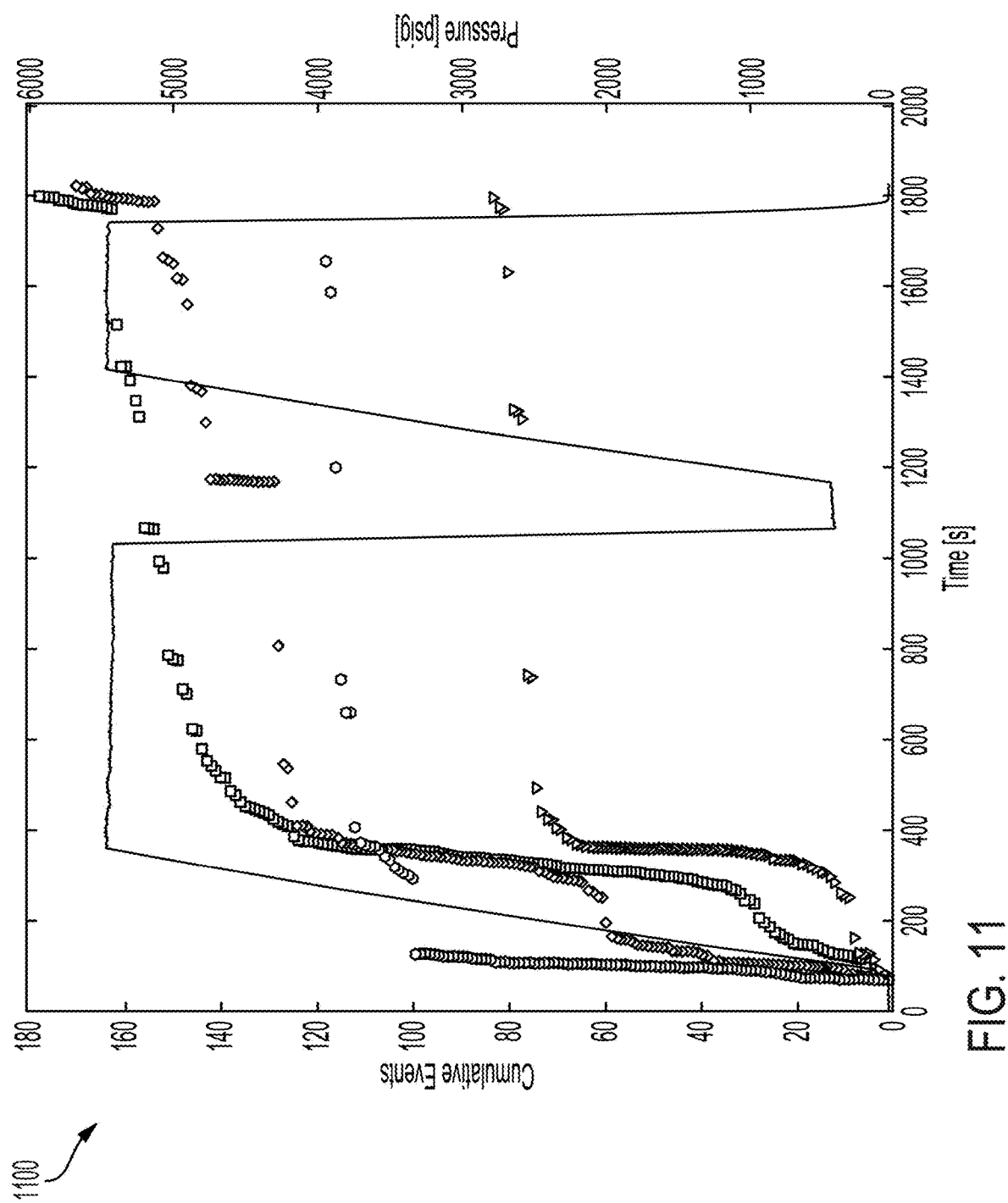
FIG. 11-13 illustrate detected data during filling of the cylinder, according to various embodiments.

FIG. 11 provides a plot 1100 of cumulative events detected on the first threshold crossing channel as a function of test time and pressure. That is, the plot 1100 shows the cumulative number of events by first detecting channel during simulated cylinder fueling. The dashed line corresponds to the pressure within the cylinder over two fill cycles.

Figure 12:
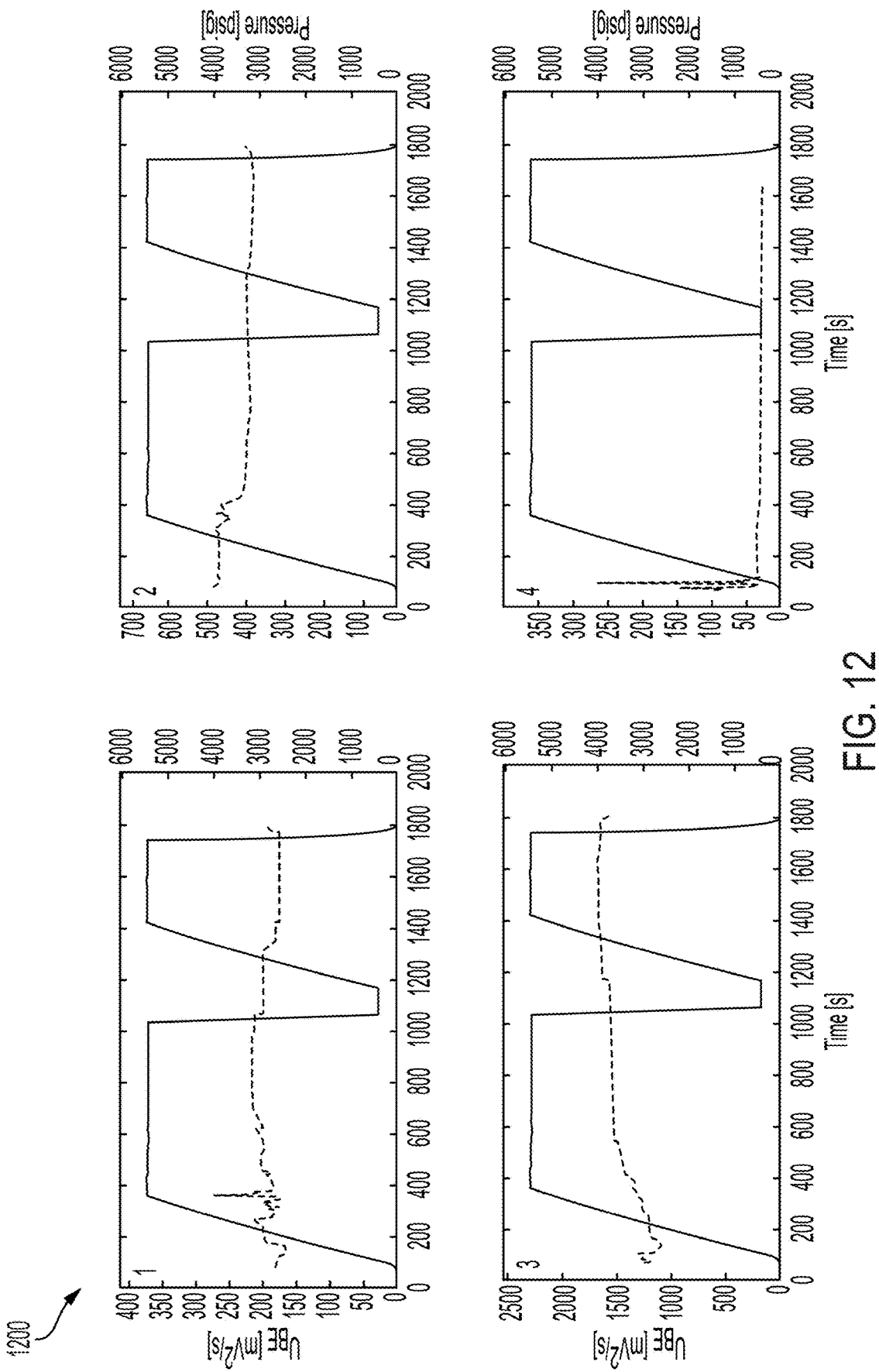

FIG. 12 illustrates local instability plots for the cylinder during simulated filling. The solid line shows pressure in the cylinder and the dashed line is background energy indicating instability indicative of local instability in a volume of the cylinder. When the background energy curve oscillates more than a specified threshold for a given cylinder construction, this indicates instability. Performance of an instability analysis found that the cylinder exhibited local instability above the threshold level established for that cylinder design on Channel 1 that would have stopped the filling process.

An instability analysis, as shown in FIG. 12 may be one of multiple factors used to determine damage to the cylinder 100 during filling, as described herein. Moreover, using frequency and energy quantification algorithms, a quantitative assessment of the extent of fiber fracture severity may be made and evaluated against a specified threshold.

Figure 13:
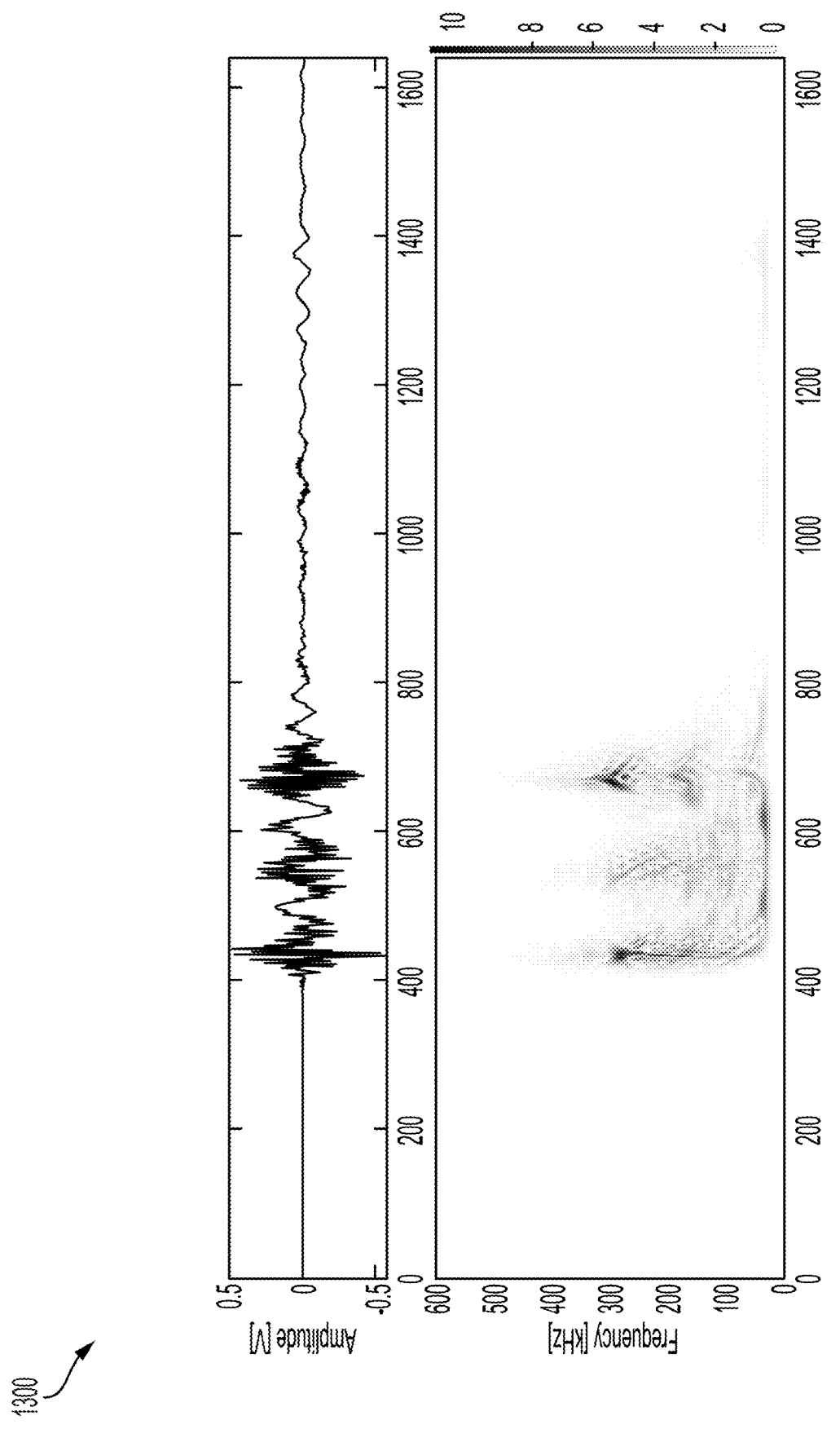

FIG. 13 presents a temporal and time-frequency domain plot of a detected fiber tow fracture event detected during the simulated filling of the impacted cylinder, emanating from the volume of material which had experienced the impact damage.

Figure 14:
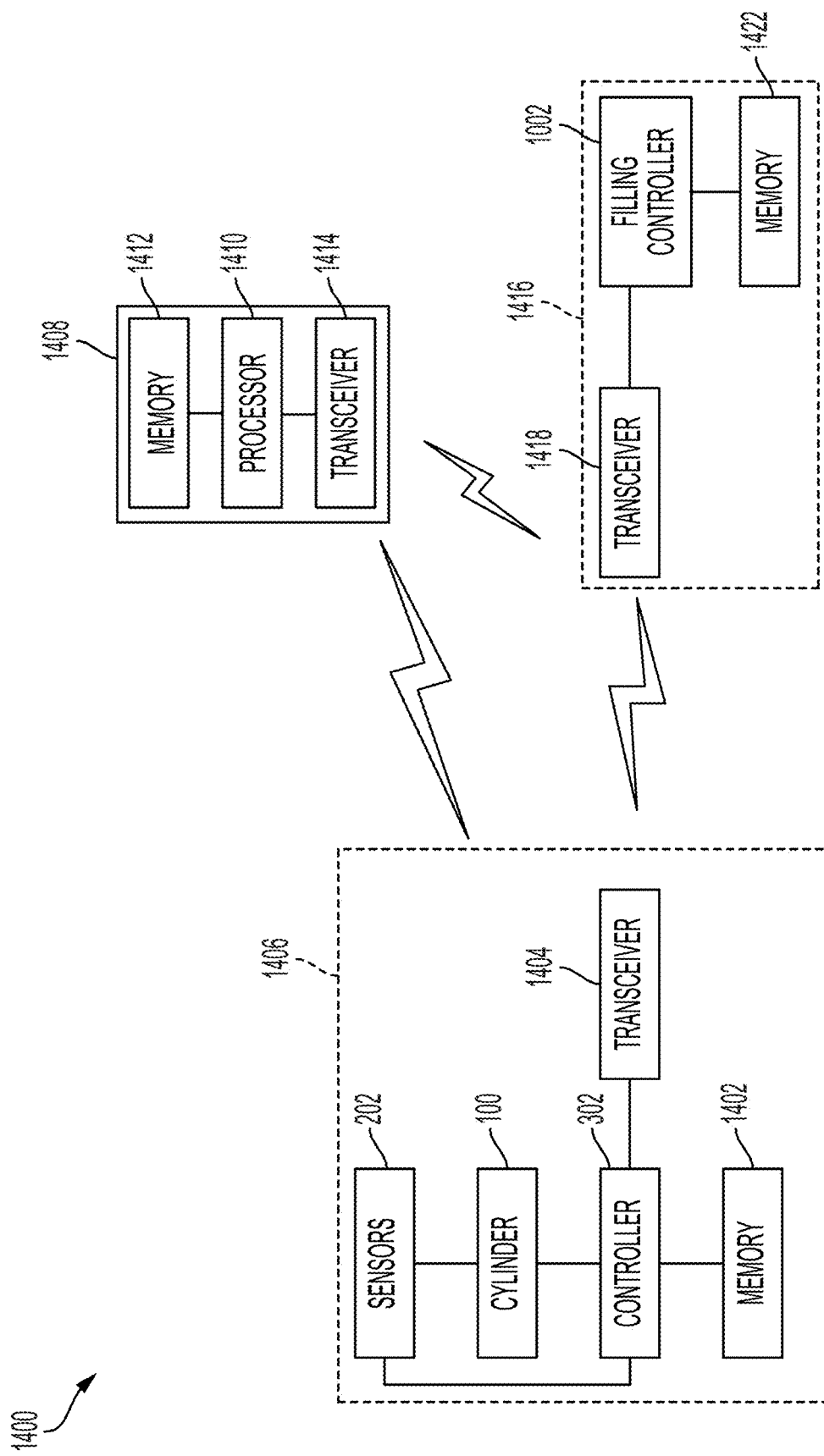
FIG. 14 is a block diagram of the system, according to various embodiments.

FIG. 14 illustrates an example system 1400, according to various embodiments of the invention. The system 1400 includes cylinder 100, sensors 202, and controller 302, each as described herein. As described herein, the sensors 202 are configured to detect deformation data of the cylinder 100 and communicate the deformation data to the controller 302.

The sensors 202 may be piezoelectric sensors (e.g., fiber Bragg grating, non-contact laser, etc.) or any other sensors configured to detect deformation of the cylinder 100. Also as described herein, the controller 302 is configured to detect damage to the cylinder 100 based on the deformation data and determine whether the damage exceeds an impact threshold. The damage may be a quantitative value determined based on the direct energy from the impact of an object contacting the cylinder 100.

The system 1400 also includes a memory 1402 coupled to the controller 302. The memory 1402 may be a non-transitory memory configured to store instructions for execution by the controller 302, which may be a computer processor, such as a microprocessor or microcontroller. The memory 1402 may also store data such as deformation data detected by the sensors 202 or a state of the cylinder 100, for example. The state of the cylinder 100 may be represented in multiple tiers (e.g., 2 tiers, 3 tiers, 4 tiers) each associated with a word (e.g., "normal," "needs inspection," "damaged") or number (e.g., 1, 2, 3, 4).

The system 1400 also includes a transceiver 1404 coupled to the controller 302. The controller 302 may use the transceiver 1404 to couple to a network such as a local area network (LAN), a wide area network (WAN), a cellular network, a digital short-range communication (DSRC), the Internet, or a combination thereof.

The transceiver 1404 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 1404 may transmit data to and receive data from devices and systems not directly connected to the controller 302. For example, the controller 302 may communicate with a remote data server 1408 and/or a filling device 1416. Furthermore, the transceiver 1404 may access the network, to which the remote data server 1408 and the filling device 1416 is also connected.

The controller 302 may also be configured to communicate with one or more computers or electronic control units (ECU) of the vehicle which is powered by the cylinder 100 (e.g., vehicle 102). The ECU of the vehicle may control one or more aspects of the vehicle, including an indicator light, display screen, speaker, or other notification device for alerting a driver or user when the controller 302 detects damage to the cylinder 100, as described herein. The controller 302 may communicate with the ECU of the vehicle via wires or via the transceiver 1404, with the ECU being coupled to its own respective transceiver. In this regard, the ECU may also be coupled to its own non-transitory memory similar to memory 1402.

The cylinder 100, sensors 202, controller 302, memory 1402, and transceiver 1404 may be collectively referred to as a cylinder monitoring device 1406. The cylinder monitoring device 1406 may be physically located on a vehicle (e.g., vehicle 102). In some embodiments, "cylinder monitoring device" may refer to the sensors 202, controller 302, memory 1402, and/or transceiver 1404, with the cylinder 100 being separate from the cylinder monitoring device. Although FIG. 14 illustrates various elements connected to the controller 302, the elements of the cylinder monitoring device 1406 may be connected to each other using a communications bus.

The controller 302 may communicate the deformation data from the sensors 202 and/or an update to the state of the cylinder 100 to a remote data server 1408. The remote data server 1408 may include a processor 1410, a memory 1412, and a transceiver 1414. The processor 1410 may be any computing device configured to execute instructions stored in a non-transitory memory. The memory 1412 may be similar to memory 1402 and configured to store instructions for execution by the processor 1410 as well as deformation data detected by the sensors 202 or a state of the cylinder 100, for example.

The transceiver 1414 is similar to transceiver 1404 and is configured to transmit and receive data from one or more other devices, such as the cylinder monitoring device 1406 and the filling device 1416.

In some embodiments, instead of the controller 302 performing determinations based on the deformation data from the sensors 202, the processor 1410 may receive the deformation data and perform one or more of the responsibilities of the controller 302 described herein. In these embodiments, it may be computationally more efficient to communicate the deformation data detected by the sensors 202 to the remote data server 1408 (via respective transceivers 1404, 1414) for processing by the processor 1410 than having the controller 302 perform the processing.

While one remote data server 1408 is shown, there may be a plurality of remote data servers 1408 configured to distribute the computational load to improve computational efficiency. In some embodiments, the remote data server 1408 may be any device capable of communicating with the cylinder monitoring device 1406 and capable of performing computer processing, such as an ECU of the vehicle or a mobile device (e.g., a smartphone, laptop, tablet).

The controller 302 may also communicate the deformation data from the sensors 202 and/or an update to the state of the cylinder 100 to the filling device 1416. The filling device 1416 includes filling controller 1002, as described herein. The filling controller 1002 is configured to control a valve (e.g., valve 902) for filling the cylinder 100. The filling controller 1002 may receive data from the controller 302 via transceiver 1418, which is similar to transceiver 1404 and transceiver 1414. The filling controller 1002 may be connected to memory 1422 (e.g., a non-transitory memory) which may be similar to memory 1402 and memory 1412 and configured to store instructions for execution by the filling controller 1002 as well as deformation data detected by the sensors 202 or a state of the cylinder 100, for example.

As used herein, a "unit" may refer to hardware components, such as one or more computer processors, controllers, or computing devices configured to execute instructions stored in a non-transitory memory.

Figure 15A:
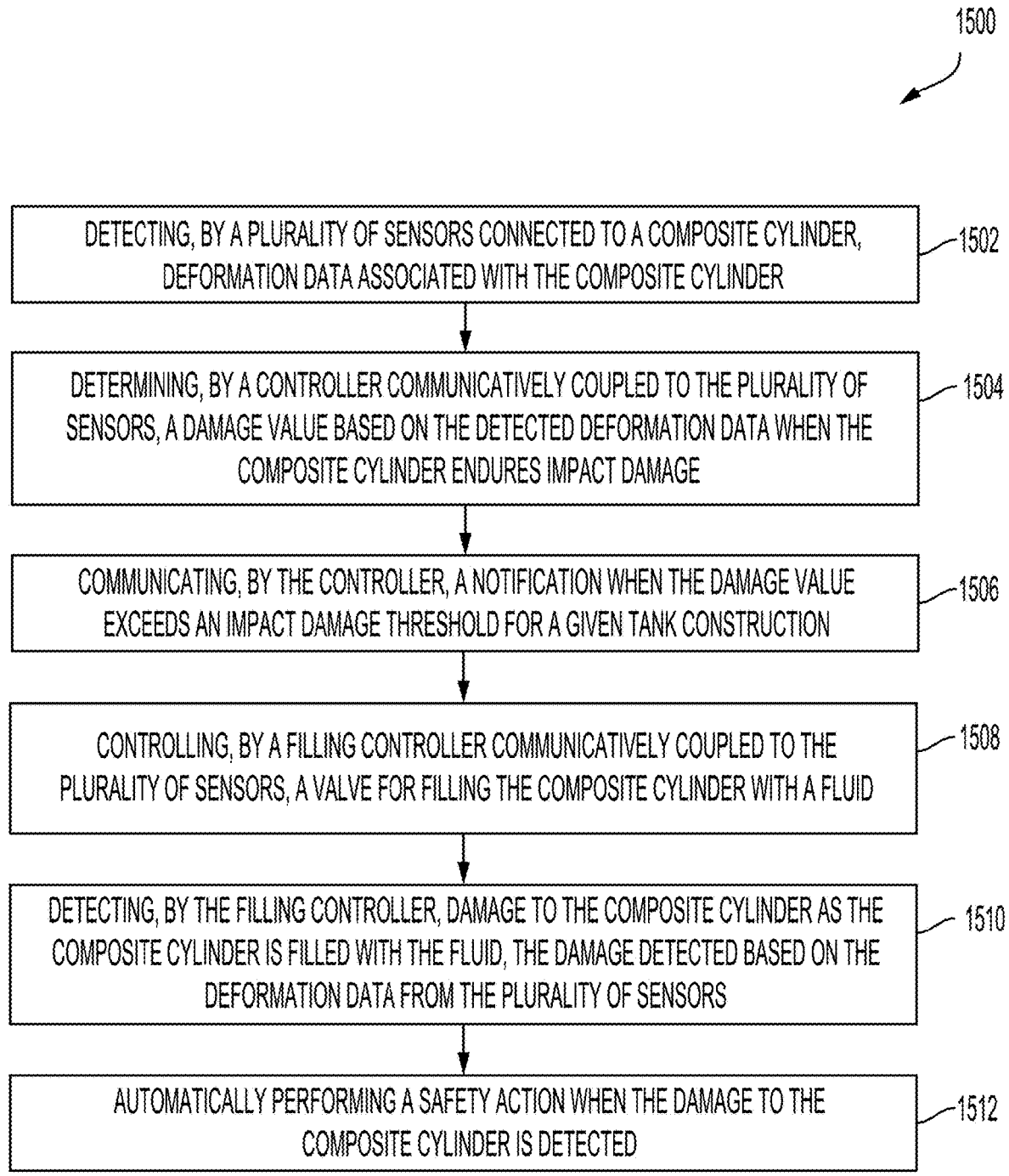
FIGS. 15A and 15B are flow diagrams of processes performed by the system, according to various embodiments of the invention.

FIG. 15A illustrates a flowchart of a process 1500 performed by the systems described herein.

A plurality of sensors (e.g., sensors 202) detect deformation data associated with a composite cylinder (e.g., cylinder 100) (step 1502). The composite cylinder may have a laminate structure having a plurality of layers and the deformation data detected by the plurality of sensors indicates damage to one or more layers of the plurality of layers. The sensors may be piezoelectric sensors located at various locations on the composite cylinder.

A controller (e.g., controller 302) determines a damage value based on the detected deformation data when the composite cylinder endures impact damage (step 1504). The sensors may be coupled to the controller in a wired or wireless manner. The damage value may be determined based on a direct wave energy determination, described in further detail herein with respect to FIG. 15B.

Continuing with the process 1500 of FIG. 15A, the controller communicates a notification when the damage value exceeds an impact damage threshold (step 1506). The impact damage threshold may be predetermined and stored in memory (e.g., memory 1402). The impact damage threshold may be different across various composite cylinder models having respective various, constructions, dimensions, and material compositions.

As described herein, the communicating, by the controller, the notification when the damage value exceeds the impact damage threshold may include communicating the notification to at least one of an ECU of a vehicle (e.g., vehicle 102) for activating a light indicating inspection of the composite cylinder or a non-transitory memory (e.g., memory 1402, 1412, 1422) for updating a stored state of the composite cylinder. Respective transceivers (e.g., transceivers 1404, 1414, 1418) may be used when the controller 302 communicates the notification when the damage value exceeds an impact damage threshold.

The notification alerts a user or operator or technician to inspect the composite cylinder before it is refilled. Any damage to the composite cylinder that is a result of the impact from the object may be detected at this point, and the composite cylinder may be removed and/or repaired if appropriate. However, there may be situations where the composite cylinder may nonetheless be refilled despite having incurred the impact damage from the object or undetected accumulated damage due to an improper operational condition (e.g., a bolt caught between the cylinder and housing).

A filling controller (e.g., filling controller 1002) configured to fill the composite cylinder with a fluid (e.g., gas fuel, liquid fuel) by controlling a valve (e.g., valve 902) (step 1508). During this filling (or re-filling) of the composite cylinder with the fluid, the sensors may be used to monitor the integrity of the composite cylinder.

The filling controller receives the deformation data from the sensors and detects damage to the composite cylinder as it is filled with the fluid based on the deformation data (step 1510). The filling controller may use a modal acoustic emission inspection using the plurality of sensors to detect the damage to the composite cylinder.

Using the modal acoustic emission inspection, the filling controller may determine whether one or more indicators exceed a respective predetermined threshold, and when they do, the filling controller may determine that there is damage to the integrity of the composite cylinder.

The one or more indicators may include a fiber tow fracture indicator corresponding to detected fiber tow fracture events being quantified and compared to a fiber tow fracture threshold, an instability indicator corresponding to instability within a local volume of material above an instability threshold, damage accumulated within a specified local volume of material, a damage mechanism indicator corresponding to damage mechanisms accumulated in the local volume of material above a damage mechanism threshold, and/or a fretting emission indicator corresponding to fretting emission above a fretting emission threshold based on a laminate composition of the composite cylinder.

The fiber tow fracture indicator is determined based on frequency and energy content of the waves detected by the sensors and reflected in the sensor data during the modal acoustic emission inspection. The fiber tow fracture indicator may also be determined based on the determined direct energy that is normalized across the plurality of sensors.

The instability indicator may be a local instability indicator determined based on detected oscillations and background energy detected by the sensors and reflected in the sensor data during the modal acoustic emission inspection.

The delamination event indicator may be determined based on the determined direct energy that is normalized across the plurality of sensors. The delamination event indicator may also be determined based on sharpness of the frequency spectrum of the waves detected by the sensors and reflected in the sensor data during the modal acoustic emission inspection.

The damage mechanism indicator may be associated with damage originating from a localized volume of material. The damage mechanism location (clustering) may be determined based on the threshold-independent arrival time determination of the damage detected by the sensors, and the shortest propagation distance on a curvilinear space of the damage detected by the sensors.

The indicators may be considered individually or in combination. When considered in combination, the indicators may be assigned respective weights. For example, both the fiber tow fracture indicator and the instability indicator may be considered, but the fiber tow fracture indicator may be given less weight than the instability indicator, or vice versa. The consideration of the indicators may change based on the composition of the composite cylinder, the materials used in the composite cylinder, the dimensions of the composite cylinder, and any other aspect of the composite cylinder. In addition, the respective thresholds for the indicators may vary based on the composition of the composite cylinder, the materials used in the composite cylinder, the dimensions of the composite cylinder, and any other aspect of the composite cylinder.

In some embodiments, the filling controller may detect the damage to the composite cylinder during filling when any one of the described indicators exceed their respective thresholds. For example, if the fiber tow fracture indicator and the instability indicator were being considered and either the fiber tow fracture indicator exceeds its threshold or the instability indicator exceeds its threshold, the filling controller detects damage to the composite cylinder during filling.

In some embodiments, the filling controller determines a combined damage indicator based on a number of indicators exceeding their respective thresholds, and when a threshold number (or percentage) of indicators exceed their respective thresholds, the detect the damage to the composite cylinder during filling. For example, the fiber tow fracture indicator, the fretting emission indicator, and the instability indicator may be considered. The threshold number of indicators exceeding their respective thresholds may be two of three. Thus, if at least two of the fiber tow fracture indicator, the fretting emission indicator, or the instability indicator exceed their respective threshold, the filling controller detects damage to the composite cylinder during filling.

In some embodiments, the filling controller determines a combined damage indicator based on a weighted number of indicators exceeding their respective thresholds, and when a threshold percentage of weighted indicators exceed their respective thresholds, the filling controller detects damage to the composite cylinder during filling. For example, the fiber tow fracture indicator, the fretting emission indicator, and the instability indicator may be considered. The fiber tow fracture may be weighted by 5, the fretting emission indicator may be weighted by 1 (indicating the fiber tow fracture is 5 times more important than the fretting emission indicator), and the instability indicator may be weighted by 2. Thus, there are 8 possible total indicator points, if each of the fiber tow fracture indicator, the fretting emission indicator, and the instability indicator exceed their respective thresholds. The threshold percentage of indicators exceeding their respective thresholds may be 65%. Thus, if the fiber tow fracture indicator exceeds its threshold (5 points), the fretting emission indicator exceeds its threshold (1 point), and the instability indicator does not exceed its threshold, the filling controller detects damage to the composite cylinder during filling because the 6 points divided by 8 points is greater than 65%. If the fiber tow fracture indicator was the only indicator to exceed its threshold, then the filling controller would not detect damage to the composite cylinder during filling because 5 points divided by 8 points does not exceed 65%.

The thresholds described herein may each be determined based on testing and calibrated for a particular composite cylinder. Each of the respective thresholds may be stored in non-transitory memory (e.g., memory 1402, 1412, 1422) and may be indexed by an identifier associated with the particular composite cylinder being monitored, so that the filling controller may reference the corresponding thresholds based on the particular composite cylinder being monitored.

Both the controller and the filling controller may execute digital signal processing algorithms for mitigating external noise sources commonly encountered during normal operations (e.g., Electromagnetic Interference (EMI), flow noise, mechanical rubbing) to avoid false triggers. The digital signal processing algorithms may be applied to the deformation data detected by the sensors. The digital signal processing algorithms may determine a false trigger based on at least one of a simultaneity of arrival of waves at the sensors, detected pre-trigger energy, or a ratio of post-triggered to pre-triggered energy.

After the filling controller detects damage to the composite cylinder as the composite cylinder is being filled with fluid, a safety action may be automatically performed (step 1512). The safety action may include the filling controller instructing the valve to be shut to prevent further filling of the composite cylinder. The safety action may include providing a notification on a speaker or a display screen of the detected damage so that an operator can cease filling of the composite cylinder. The safety action may include the filling controller adjusting the valve to direct the fluid to a surge tank.

These automatic processes during filling of the composite cylinder may always be performed, regardless of whether the controller detected impact damage to the composite cylinder. In other embodiments, the automatic processes during filling of the composite cylinder may only be performed when the controller detected impact damage to the composite cylinder.

Figure 15B:
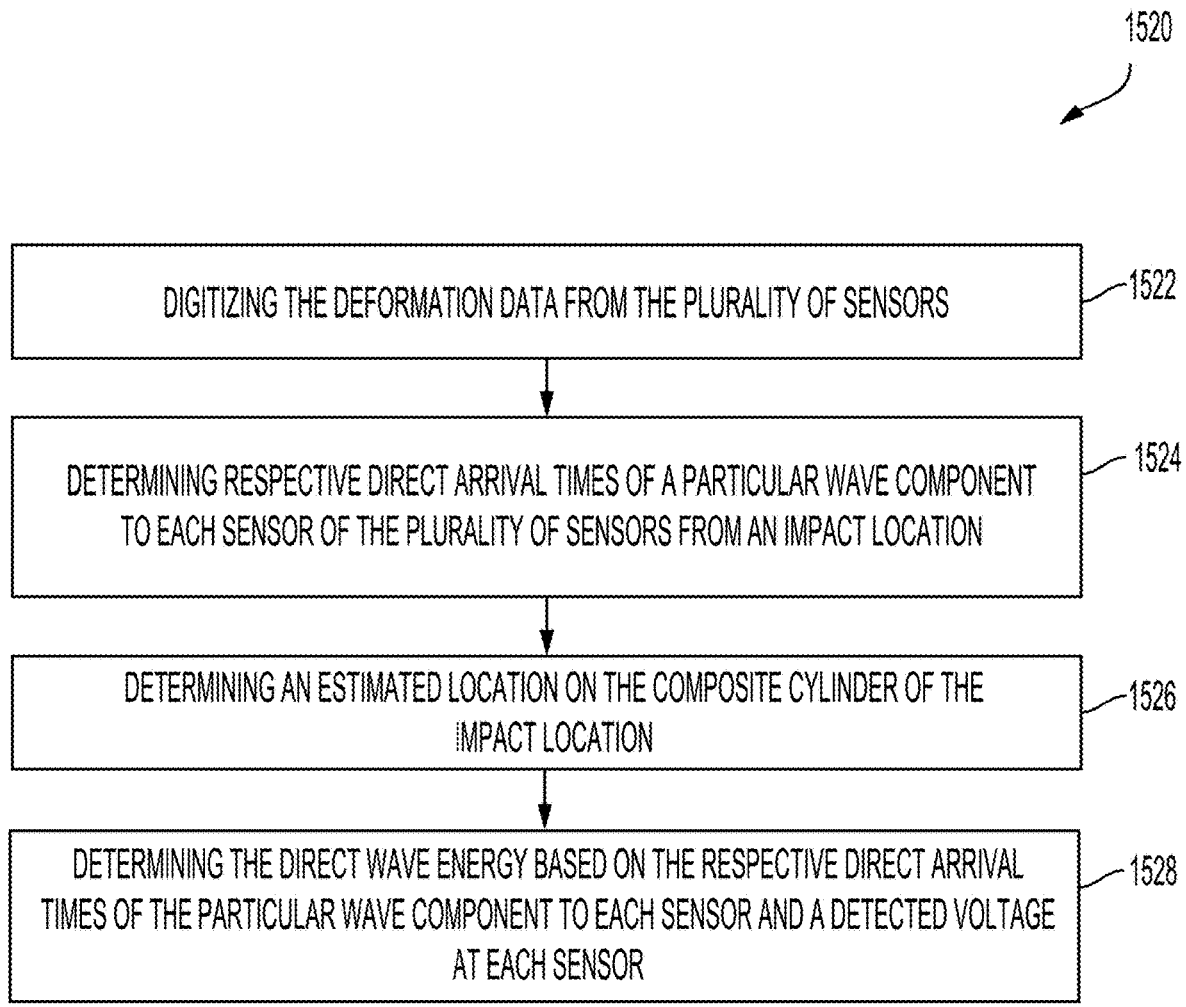

FIG. 15B illustrates a flowchart of a process 1520 of determining the direct wave energy performed by the systems described herein. The process 1520 may be used by the controller during determination of the damage value associated with the impact damage during step 1504 of process 1500 in FIG. 15A.

The controller (e.g., controller 302) receives the deformation data from the sensors (e.g., sensors 202) and digitizes the deformation data (step 1522).

The controller then determines respective direct arrival times of a particular wave component to each sensor of the plurality of sensors from an impact location (step 1524). That is, each sensor of the plurality of sensors detects the deformation data (e.g., the deformation data shown in waves from four sensors are shown in four channels in FIG. 5). A common particular wave component for each wave is identified (e.g., as indicated by the vertical bar in each wave from the four sensors in FIG. 6). The arrival time of the common particular wave is determined for each of the sensors. The arrival time represents the time for the particular wave component to travel from the impact location to the respective sensor.

The controller determines an estimated location on the composite cylinder of the impact location (step 1526). The estimated location may be determined based on the determined arrival times, the velocity of the wave component used for arrival time estimation, the geometry of the particular cylinder being monitored, and the known locations of the sensors on the cylinder. The geometries of various cylinders, dispersion relations (wave mode velocity as a function of frequency), and the known locations of the sensors may be stored in memory (e.g., memory 1402, 1412, 1422) and accessed by the controller. The controller may model the estimated location on the composite cylinder of the impact location (e.g., as shown in FIG. 7).

The controller determines the direct wave energy based on the respective direct arrival times of the particular wave component to each sensor and a detected voltage at each sensor (step 1528). In some embodiments, the controller may use the equation $U_{WAVE} = \int_0^{t_{DIRECT}} V^2 dt$, for determining the direct waveform energy ($U_{WAVE}$), where $t_{DIRECT}$ represents the direct arrival time of the lowest velocity wave component of interest at each sensor for the given propagation distance, and V represents voltage detected at each sensor (e.g., piezoelectric sensor).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents. Each and every feature described herein, and each and every combination of two or more of such features, is included within the scope of the present invention provided that the features included in such a combination are not mutually inconsistent.

What is claimed is:

1. A monitoring system comprising:
    a plurality of piezoelectric sensors connected to a composite cylinder having a laminate structure, each piezoelectric sensor of the plurality of piezoelectric sensors configured to passively detect deformation data associated with the composite cylinder without emitting signals to be detected by respective other sensors when the composite cylinder is impacted by an object and when the composite cylinder is filled with a fluid by detecting out-of-plane displacement of the laminate structure of the composite cylinder and transducing resultant stress waves into a voltage; and
    a controller communicatively coupled to the plurality of piezoelectric sensors and configured to:
        receive, from the plurality of piezoelectric sensors, the detected deformation data associated with the composite cylinder when the composite cylinder is impacted by an object,
        determine a direct wave energy from the object based on the detected deformation data when the composite cylinder is impacted by the object, the direct wave energy being used to mitigate reflections and wrapping waves and determined based on a direct arrival time of a slowest moving wave component from a calculated impact location and the voltage detected at each of the plurality of piezoelectric sensors, and
        communicate a notification when a damage value exceeds an impact damage threshold,
    wherein the plurality of piezoelectric sensors are communicatively coupled to a filling controller configured to:
        control a valve for filling the composite cylinder with the fluid,
        receive, from the plurality of piezoelectric sensors, deformation data associated with the composite cylinder while the composite cylinder is being filled with the fluid,
        detect damage to the composite cylinder as the composite cylinder is filled with the fluid using a modal acoustic emission inspection, the modal acoustic emission inspection being based on at least one of: a fiber tow fracture indicator corresponding to detected fiber tow fracture events being quantified and compared to a fiber tow fracture threshold, an instability indicator corresponding to instability within a local volume of material above an instability threshold, a delamination event indicator corresponding to delamination of one or more layers of the composite cylinder above a delamination threshold, a damage mechanism indicator corresponding to damage mechanisms accumulated in the local volume of material above a damage mechanism threshold, or a fretting emission indicator corresponding to fretting emission above a fretting emission threshold based on a laminate composition of the composite cylinder, and
        automatically perform a safety action when the damage to the composite cylinder is detected.

2. The system of claim 1, wherein the controller determines the direct wave energy by:
    digitizing the deformation data from the plurality of piezoelectric sensors,
    determining respective direct arrival times of a wave component of interest to each piezoelectric sensor of the plurality of piezoelectric sensors from an impact location,
    determining the calculated impact location, and
    determining the direct wave energy based on the respective direct arrival times of the wave component of interest to each piezoelectric sensor and a detected voltage at each piezoelectric sensor.

3. The system of claim 1, wherein the controller is configured to communicate the notification to at least one of an electronic control unit (ECU) of a vehicle for activating a light indicating inspection of the composite cylinder or a non-transitory memory for updating a stored state of the composite cylinder.

4. The system of claim 1, wherein the safety action includes at least one of shutting the valve to prevent filling of the composite cylinder, providing a notification on a speaker or a display screen, or adjusting the valve to direct the fluid to a surge tank.

5. The system of claim 1, wherein a periodic inspection of the composite cylinder is satisfied using the deformation data.

6. A method, comprising:
    detecting, by a plurality of piezoelectric sensors connected to a composite cylinder having a laminate structure, each piezoelectric sensor of the plurality of piezoelectric sensors configured to passively detect deformation data associated with the composite cylinder without emitting signals to be detected by respective other sensors, when the composite cylinder is impacted by an object and when the composite cylinder is filled with a fluid, by detecting out-of-plane displacement of the laminate of the composite cylinder and transducing stress waves into a voltage;

receiving, by a controller communicatively coupled to the plurality of piezoelectric sensors, the detected deformation data associated with the composite cylinder when the composite cylinder is impacted;

determining, by the controller, a direct wave energy from the object based on the detected deformation data when the composite cylinder is impacted, the direct wave energy being used to mitigate reflections and wrapping waves and determined based on a direct arrival time of a slowest moving wave component from a calculated impact location and the voltage detected at each of the plurality of piezoelectric sensors;

communicating, by the controller, a notification when a damage value exceeds an impact damage threshold;

controlling, by a filling controller communicatively coupled to the plurality of piezoelectric sensors, a valve for filling the composite cylinder with the fluid;

receiving, by the filling controller from the plurality of piezoelectric sensors, deformation data associated with the composite cylinder while the composite cylinder is being filled with the fluid;

detecting, by the filling controller, damage to the composite cylinder as the composite cylinder is filled with the fluid, using a modal acoustic emission inspection, the modal acoustic emission inspection being based on at least one of: a fiber tow fracture indicator corresponding to detected fiber tow fracture events being quantified and compared to a fiber tow fracture threshold, an instability indicator corresponding to instability within a local volume of material above an instability threshold, a delamination event indicator corresponding to delamination of one or more layers of the composite cylinder above a delamination threshold, a damage mechanism indicator corresponding to damage mechanisms accumulated in the local volume of material above a damage mechanism threshold, or a fretting emission indicator corresponding to fretting emission above a fretting emission threshold based on a laminate composition of the composite cylinder; and automatically performing a safety action when the damage to the composite cylinder is detected.

7. The method of claim 6, wherein the determining the direct wave energy comprises:

digitizing the deformation data from the plurality of piezoelectric sensors, determining respective direct arrival times of a wave component of interest to each piezoelectric sensor of the plurality of piezoelectric sensors from an impact location, determining the calculated impact location, and determining the direct wave energy based on the respective direct arrival times of the wave component of interest to each sensor and a detected voltage at each piezoelectric sensor.

8. The method of claim 6, wherein the communicating, by the controller, the notification when the damage value exceeds the impact damage threshold comprises communicating the notification to at least one of an ECU of a vehicle for activating a light indicating inspection of the composite cylinder or a non-transitory memory for updating a stored state of the composite cylinder.

9. The method of claim 6, wherein the safety action includes at least one of shutting the valve to prevent further filling of the composite cylinder, providing a notification on a speaker or a display screen, or adjusting the valve to direct the fluid to a surge tank.

10. The method of claim 6, further comprising satisfying a periodic inspection of the composite cylinder using the deformation data.

* * * * *